US009205719B2

(12) United States Patent
Frank et al.

(10) Patent No.: US 9,205,719 B2
(45) Date of Patent: Dec. 8, 2015

(54) AIR SUSPENSION INSTALLATION, COMPRESSED AIR SUPPLY INSTALLATION AND PNEUMATIC SYSTEM

(75) Inventors: Dieter Frank, Hannover (DE); Frank Meissner, Hannover (DE); Uwe Stabenow, Laatzen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/993,764

(22) PCT Filed: Nov. 22, 2011

(86) PCT No.: PCT/EP2011/005866
§ 371 (c)(1),
(2), (4) Date: Jun. 13, 2013

(87) PCT Pub. No.: WO2012/079691
PCT Pub. Date: Jun. 21, 2012

(65) Prior Publication Data
US 2013/0257007 A1 Oct. 3, 2013

(30) Foreign Application Priority Data
Dec. 16, 2010 (DE) .................. 10 2010 054 705

(51) Int. Cl.
*B60G 17/056* (2006.01)
*B60G 17/052* (2006.01)

(52) U.S. Cl.
CPC ........ *B60G 17/0521* (2013.01); *B60G 17/0523* (2013.01); *B60G 17/0525* (2013.01);
(Continued)

(58) Field of Classification Search
CPC ........... B60G 17/0523; B60G 17/0525; B60G 17/0526; B60G 17/0528; B60G 17/056; B60G 17/0565; B60G 2500/202; B60G 2500/2021; B60G 2500/302; B60G 2500/2012; B60G 2500/204; B60G 2500/2041; B60G 2500/2042; B60G 2500/2046; F16F 9/43
USPC .................................................... 280/124.16
See application file for complete search history.

(56) References Cited

U.S. PATENT DOCUMENTS

| | | | |
|---|---|---|---|
| 4,756,548 | A | 7/1988 | Kaltenthaler et al. |
| 5,467,595 | A | 11/1995 | Smith |

(Continued)

FOREIGN PATENT DOCUMENTS

| | | |
|---|---|---|
| DE | 35 42 974 A1 | 6/1987 |
| DE | 692 08 470 T2 | 3/1996 |

(Continued)

OTHER PUBLICATIONS

English Translation of the Written Opinion of the International Search Authority for PCT/EP2011/005866 (WO 2012/079691), Jun. 16, 2013.*

*Primary Examiner* — Keith Frisby
(74) *Attorney, Agent, or Firm* — Kramer Levin Naftalis & Frankel LLP

(57) ABSTRACT

A pneumatic installation, especially an air suspension installation for a vehicle, operates in conjunction with a compressed air supply installation and comprises: a gallery line, at least one air spring having a pressure chamber, which can be pneumatically connected to the gallery line, an accumulator for compressed air, which is pneumatically connectable to the gallery line, and a compressed air port for pneumatic connection of the pneumatic installation and the compressed air supply installation. The pneumatic connection comprises a controllable shut-off valve system, which is formed by at least one directional valve and has first, second and third ports, the accumulator being pneumatically connected to the first port, the compressed air port being pneumatically connected to the second port, and the gallery line being pneumatically connected to the third port, the second port being switchable to a closed state in which the pneumatic connection is completely closed in both directions.

19 Claims, 15 Drawing Sheets

(52) U.S. Cl.
CPC ....... *B60G2202/152* (2013.01); *B60G 2300/07* (2013.01); *B60G 2500/202* (2013.01); *B60G 2500/204* (2013.01); *B60G 2500/2012* (2013.01); *B60G 2500/2021* (2013.01); *B60G 2500/2042* (2013.01); *B60G 2500/2044* (2013.01); *B60G 2500/30* (2013.01); *B60G 2600/26* (2013.01)

(56) References Cited

U.S. PATENT DOCUMENTS

| | | | |
|---|---|---|---|
| 6,074,177 | A | 6/2000 | Kobayashi et al. |
| 6,098,967 | A | 8/2000 | Folchert |
| 6,231,321 | B1 * | 5/2001 | Fukudome et al. ............ 417/502 |
| 6,685,174 | B2 * | 2/2004 | Behmenburg et al. ..... 267/64.28 |
| 6,726,189 | B2 * | 4/2004 | Folchert et al. ............ 267/64.16 |
| 6,752,402 | B2 | 6/2004 | Grotendorst et al. |
| 6,817,600 | B2 | 11/2004 | Ocker et al. |
| 7,032,895 | B2 | 4/2006 | Folchert |
| 7,097,166 | B2 * | 8/2006 | Folchert ..................... 267/64.28 |
| 7,441,789 | B2 | 10/2008 | Geiger et al. |
| 7,741,941 | B2 * | 6/2010 | Buezis et al. ................. 335/265 |

FOREIGN PATENT DOCUMENTS

| | | |
|---|---|---|
| DE | 199 11 933 A1 | 9/1999 |
| DE | 101 21 582 C2 | 11/2002 |
| DE | 102 23 405 B4 | 12/2003 |
| DE | 102 40 358 A1 | 3/2004 |
| DE | 10 2008 011 543 A1 | 9/2009 |
| DE | 10 2008 064 647 A1 | 2/2010 |
| EP | 1 216 860 B1 | 6/2002 |
| EP | 1 243 447 A2 | 9/2002 |
| EP | 1 380 453 B1 | 1/2004 |
| GB | 2 292 916 A | 3/1996 |
| JP | 1 141112 | 6/1989 |

\* cited by examiner (A) gallery normally open, armature not operated
- filling/venting the bellows
- reservoir closed
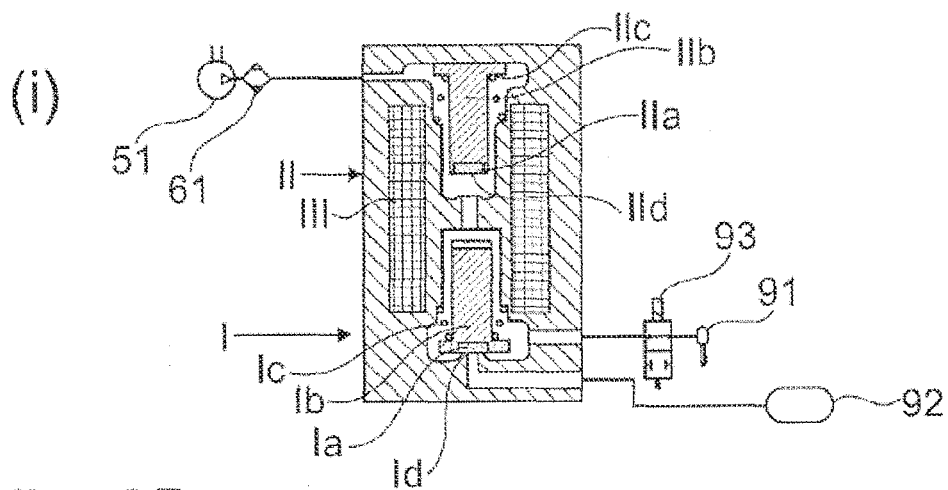
Fig. 3B
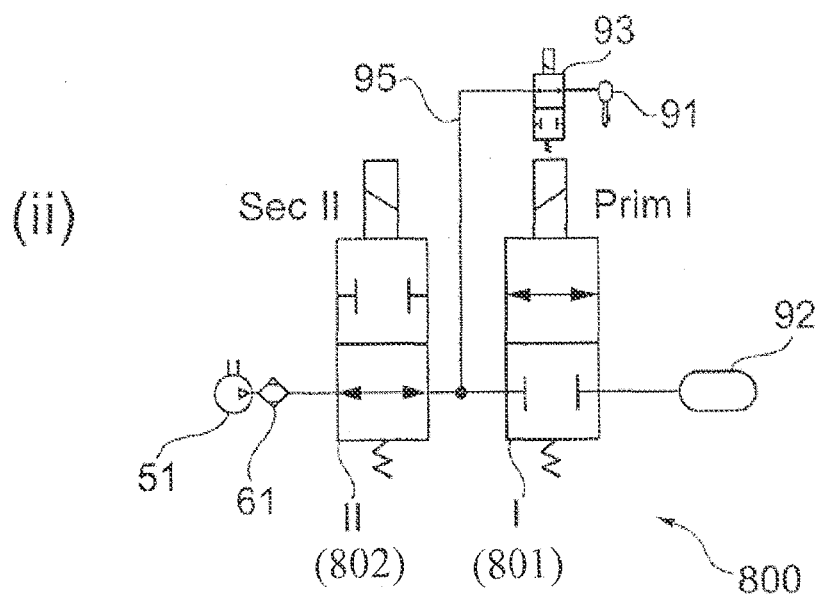

(B) primary armature operated
- memory filled
- bellows valves closed
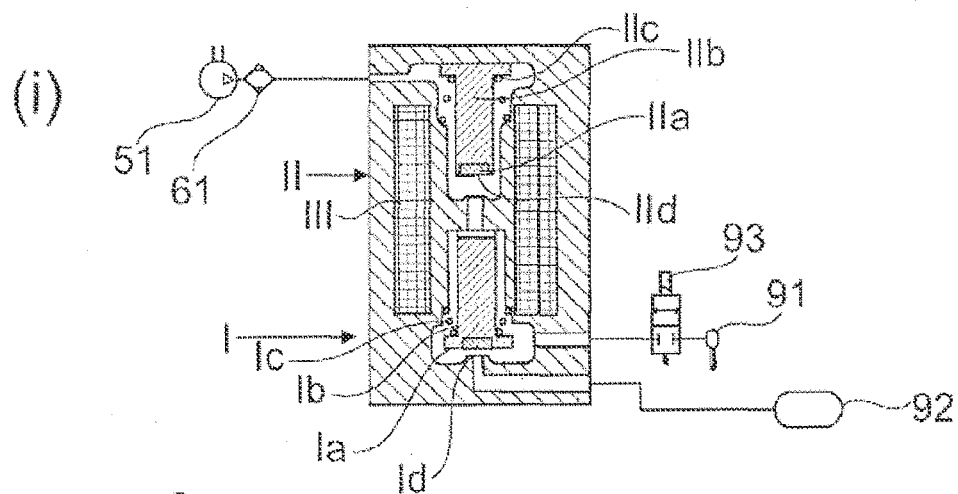
Fig. 3C
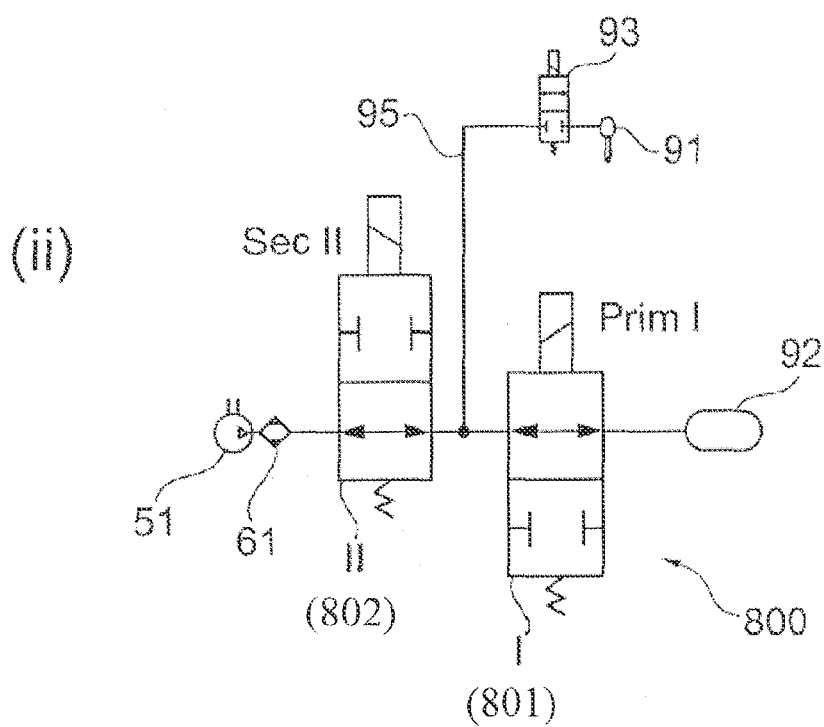

(C) secondary armature, primary armature operated
- transferring from reservoir to bellows
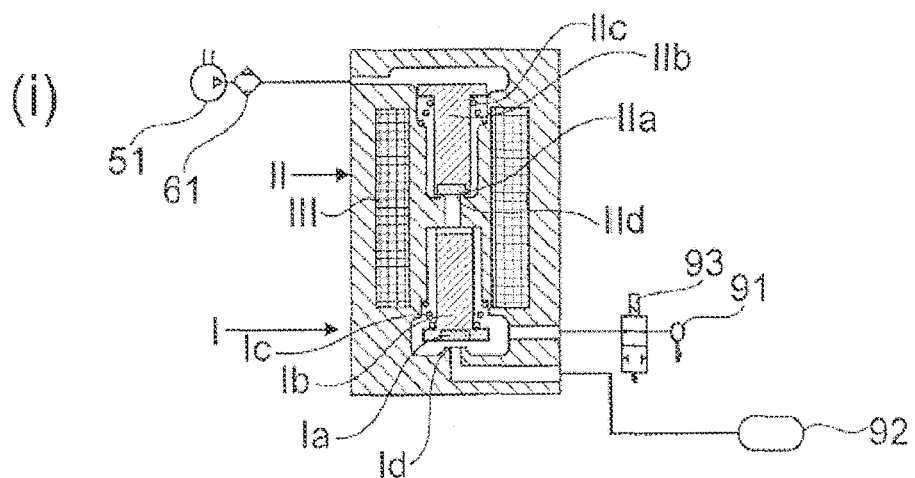
(i)
Fig. 3D
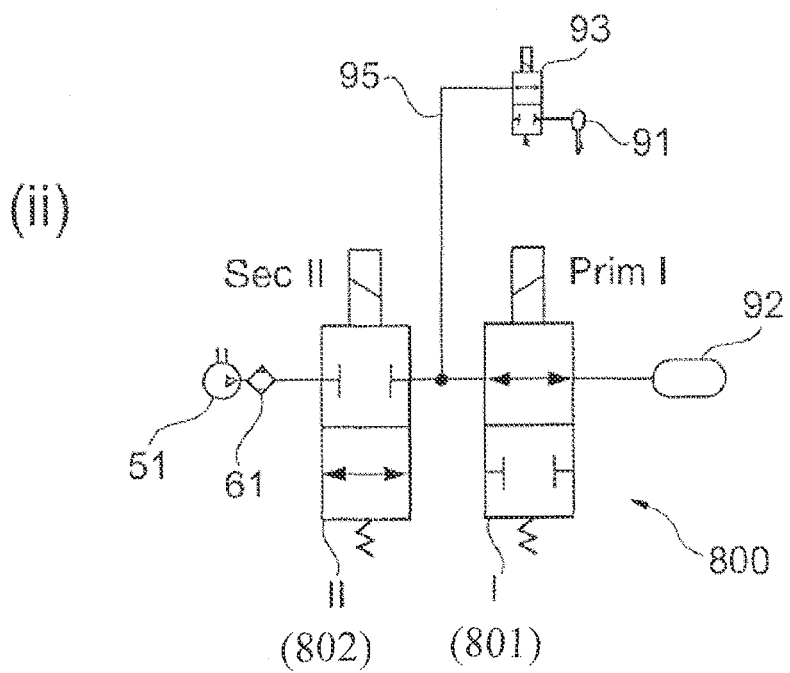
(ii)

AIR SUSPENSION INSTALLATION, COMPRESSED AIR SUPPLY INSTALLATION AND PNEUMATIC SYSTEM

FIELD OF THE INVENTION

The invention generally relates to an air suspension installation having a pneumatic installation and a compressed air supply installation, and to a pneumatic system having the air suspension installation.

BACKGROUND OF THE INVENTION

A compressed air supply installation is used in vehicles of all types, in particular for supplying an air suspension installation of a vehicle with compressed air. Air suspension installations can also comprise level control devices, with which the distance between the vehicle axle and the vehicle body can be adjusted. An air suspension installation of a pneumatic system comprises a plurality of air bellows pneumatically connected to a common line (gallery), which can lift the vehicle body with increased filling and correspondingly lower the body with reduced filling. With increasing distance between the vehicle axle and the vehicle body or increasing ground clearance, the spring travels are longer and larger ground unevenness can also be overcome without this causing contact with the vehicle body. Such systems are increasingly used in off-road vehicles and Sport Utility Vehicles (SUV). In particular, with SUVs, it is desirable in the case of very powerful engines to provide the vehicle, on the one hand, with relatively small ground clearance for high speeds on the road and, on the other hand, with a relatively large ground clearance for off-road. It is also desirable to carry out a change of the ground clearance as rapidly as possible, which increases the requirements with regard to speed, flexibility and reliability of a compressed air supply installation.

In order to provide for long-term operation of the compressed air supply installation, a main pneumatic line comprises an air dryer, with which the compressed air is dried. Collection of moisture in the pneumatic system is thereby prevented.

At relatively low temperatures, moisture can lead to valve-damaging crystal formation and other unwanted effects in the compressed air supply installation and in the pneumatic installation. An air dryer comprises a drying means, normally a bed of pellets, through which the compressed air can flow, so that the bed of pellets can take up moisture contained in the compressed air by adsorption. If applicable, an air dryer can be designed as a regenerative air dryer. The bed of pellets carries a throughflow of the dried compressed air from the pneumatic installation, in particular an air suspension installation, for each venting cycle in a counter flow or a direct flow relative to the filling direction. A regeneration of the air dryer is essentially enabled by a pressure change at the air dryer, wherein a pressure during the regeneration is frequently low in comparison to the adsorption in order to enable the output of moisture from the granulate. For this purpose, the venting valve assembly can be opened, wherein the regenerative capacity of the air dryer is frequently dependent on the pressure conditions and the pressure change in the compressed air supply installation. It is also desirable for such a so-called pressure change adsorption to provide a compressed air supply installation that is both flexible and reliable. In particular, on the one hand, relatively rapid venting is desirable, and yet a sufficiently low air pressure is to be available for regeneration of the air dryer.

A level control device provided with air filters for vehicles is known from the applicant's DE 35 429 74 A1, by which, depending on the load on the vehicle, a specified distance of the vehicle cell from the vehicle axle can be adjusted by filling or emptying the air springs. The device has a safety valve that is controllable by the pressure in the air springs. Regeneration of the air dryer is possible for such an installation by means of a choke and a non-return valve to be opened against a filling direction.

DE 199 11 933 B4 discloses a compressed air supply installation having an air dryer with a first compressed air supply line, wherein the compressed air is passed through drying means of the air dryer, and a second compressed air supply line, which can carry a throughflow without the compressed air being passed through the drying means.

A variety of approaches are known for making a pneumatic connection between a compressed air feed and a pneumatic installation. These approaches take into account the basic functions of a compressed air supply installation during pressurization of the pneumatic installation and venting of the pneumatic installation. With respect to the requirement for relatively rapid venting with a sufficiently low air pressure for regeneration of the air dryer, there is, however, still room for improvement.

DE 102 23 405 B4 discloses an air suspension system of a motor vehicle with a compressed air supply installation having a pressure line for connecting a compressor to the air springs and a venting line, via which the pressure line can be connected to the atmosphere, the connection being able to be blocked by means of a switching valve. A section of the pressure line in the form of a pneumatic parallel circuit is provided between a dryer and level control valves of a gallery of the air suspension installation and comprises a choke disposed parallel to a non-return valve and parallel to another switching valve. The switching valve in the venting line and the switching valve in the section of the pressure line are connected via electrical control lines to the same final stage of a controller.

DE 101 21 582 C2 discloses an air supply unit for an air suspension installation, in which a venting valve is provided in a venting line, an air suspension valve is provided in the gallery of the air suspension installation and an air control valve is provided. All three valves are connected to an electronic control unit. In a section of a pressure line in the form of a pneumatic parallel circuit between the dryer and the spring valve, the air control valve is connected parallel to a non-return valve, so that air can be taken into the air suspension installation without hindrance, but can only be let out again under the control of the air control valve. All three valves are opened for blowing off compressed air from the air suspension installation.

U.S. Pat. No. 6,098,967 discloses a compressed air supply installation in which a section in the form of a pneumatic parallel circuit with two parallel connected branch lines is disposed in the main pneumatic line between the air dryer and the air suspension installation. A non-return valve that can conduct a flow to supply air is connected in a first branch line and a non-return valve that can conduct a flow for venting is connected in a second branch line in series with a choke and a switching valve.

EP 1 216 860 B1 discloses a level control installation for a motor vehicle with air springs and with a controller, which controls or regulates the filling and emptying functions depending on the level of the vehicle body. A controllable control valve of a compressed air supply installation and a controllable control valve upstream of a reservoir are connected to the controller. The controllable, and in the opened state only constantly choked, control valve of the compressed air supply installation is disposed in a parallel connection to a non-return valve.

The relatively complex or component-intensive connection of an air suspension installation to the compressed air supply installation, which is still capable of improvement, is problematic with all of the foregoing conventional compressed air supply installations. Because of the section that is frequently in the form of a parallel circuit in a main pneumatic line, this is open at least in a bypass line or, e.g., opens against a back pressure of a non-return valve.

EP 1 243 447 A2 discloses (in FIG. 9) a closed level control installation with a gallery line, to which a plurality of bellows are connected, each acting as a pressure chamber for an air spring, and a controllable isolating valve assembly of a pneumatic installation formed by a series arrangement of a first 2/2-way valve and of a second 2/2-way valve. The second control valve is disposed in the compressed air line between the first controllable control valve and the air springs. The gallery line is connected to the second control valve. The pneumatic installation can be filled and vented by the compressed air supply installation connected to the first control valve via the isolating valve assembly. A compressed air reservoir is connected via a separate control valve and a separate pneumatic line to the compressed air supply installation.

EP 1 380 453 B discloses a similar closed level control installation for vehicles, by means of which a vehicle body is sprung relative to at least one vehicle axle. The pneumatic installation can be filled and vented by a compressed air supply installation connected to a single 2/2-way valve. With this, the compressed air reservoir is connected via a separate control valve and a separate pneumatic line to the compressed air supply installation. The compressed air reservoir is isolated from the compressed air supply installation separately from an air suspension installation by a 4/4-way valve or two 2/2-way valves.

The pneumatic systems can also be improved further with a relatively complex connection of the pneumatic installation to the necessarily closed compressed air supply installation.

SUMMARY OF THE INVENTION

Generally speaking, it is an object of the present invention to provide an improved pneumatic installation and compressed air supply installation for the operation of a pneumatic installation that provide reliable and yet flexible, possibly rapid operation. That is, it is an object of the present invention to provide a pneumatic installation and a compressed air supply installation of relatively simple construction that enable relatively rapid venting with highly advantageous dryer regeneration and also improved acoustic characteristics.

It is a further object of the present invention to provide a pneumatic system having an improved pneumatic installation and an improved compressed air supply installation.

It is a still further object of the present invention to provide a vehicle system and/or a vehicle with an improved pneumatic system and a controller that has a control connection to the isolating valve assembly and/or to the venting valve. In particular, a common or respective separate control line can be provided for the isolating valve assembly and/or the venting valve.

A compressed air supply installation can be operated with compressed air in a pneumatic system with a pneumatic installation in an air suspension installation, e.g., in the context of a pressure level of 5 through 20 bar. The compressed air is provided to the compressed air supply installation from a compressed air feed. The compressed air can be generated for the compressed air feed by an air compressor disposed between the air feed and a compressed air supply connection. The compressed air feed is connected via a first pneumatic connection to a compressed air connection to the pneumatic installation for supplying the pneumatic installation. The pneumatic connection of the compressed air supply installation advantageously comprises a main pneumatic line. Moreover, the compressed air supply installation comprises a second pneumatic connection, advantageously a venting line, with a controllable venting valve, which is pneumatically connected to the main pneumatic line and to a venting connection to the surroundings. The compressed air feed is thereby pneumatically connected via the controllable venting valve to a venting connection to the surroundings. By means of the controllable venting valve, the compressed air supply installation can be vented to the venting connection by blowing off air, in particular to also vent the pneumatic installation. This is a so-called open compressed air supply installation, because it is directly vented to the surroundings or compressed air is taken in directly from the surroundings through the compressed air supply connection. The first and second pneumatic connections are preferably connections that are separately connected to a common compressed air supply connection; the first and second pneumatic connections, preferably in the form of the main pneumatic line and the venting line, can however also wholly or partly come together in a line, which can be used both for venting and also for filling the pneumatic installation.

The design of the pneumatic connection between the compressed air feed and a compressed air connection of the air suspension installation can represent a basis for improved dryer regeneration, in particular also flexible and potentially faster venting of the compressed air supply installation and/or the pneumatic installation or the pressurization thereof. The compressed air connection of the air suspension installation and/or a main pneumatic line of the compressed air supply installation can be relatively simply designed to represent the pneumatic connection. The pneumatic connection can be bidirectionally and fully closable. For this purpose, a controllable isolating valve assembly formed of at least one control valve can be provided in the pneumatic connection between the compressed air supply installation and the pneumatic installation.

The pneumatic installation can be filled and vented from the compressed air supply installation via the isolating valve assembly. The compressed air supply installation can, advantageously, be designed as open and above all to be simple to avoid the disadvantages of a closed compressed air supply installation; in particular, it can be operated at a lower pressure level and thus with lower energy costs.

An isolating valve and/or a venting valve are, advantageously, control valves. A controllable isolating valve of the isolating valve assembly can—in an isolation mode—be switched to a closed state, wherein in the closed state the pneumatic connection is bidirectionally and fully isolated, i.e., is closed. In other words, a pneumatic connection between the compressed air feed and the pneumatic installation is pneumatically tightly closed when the controllable isolating valve is in the closed state. This leads to decoupling of the compressed air supply installation and the pneumatic installation. The pneumatic connection is formed by means of the main pneumatic line of the compressed air supply installation and the pneumatic line of the pneumatic installation as well as a compressed air connection that connects the same. In an embodiment, the isolating valve assembly can be disposed in the main pneumatic line of the compressed air supply installation. In another embodiment, the isolating valve assembly can be disposed in the pneumatic line of the pneumatic installation. In principle, the isolating valve assembly can be disposed at any point in the pneumatic connection without an affiliation to the compressed air supply installation or pneumatic installation having to be specified. Advantageously, the main pneumatic line or pneumatic line is the only line of the pneumatic connection. Preferably, the isolating valve assembly is the only valve assembly in the pneumatic connection. The isolating valve assembly can be disposed with a restrictor in a series arrangement in the main pneumatic line or pneumatic line as a single pneumatic connection.

With a pneumatic connection that can be disconnected bidirectionally and completely, it is possible to achieve diverse operating states for the pneumatic installation, in particular an air suspension installation, without the compressed air supply installation being influenced thereby—potentially ineffective influence on the air dryer is thereby avoided. It is also advantageous to provide the main pneumatic line or the pneumatic line as a single line to represent the pneumatic connection between the compressed air feed and the compressed air connection. Thus, for a pneumatically fully and bidirectionally closed pneumatic connection in an air suspension installation connected to the compressed air connection, a pressure measurement can be taken in the reservoir or the bellows. Cross-switching of the reservoir and/or bellows can also take place via the gallery of the air suspension installation without the compressed air supply installation, in particular an air dryer, being adversely affected.

Conversely, the controllable isolating valve assembly can be set—in a throughflow mode—to an open state such that the series arrangement of the controllable isolating valve in the open state and the restrictor represents an optimized series arrangement for filling the pneumatic installation and venting the pneumatic installation. Using the series arrangement, dryer regeneration can be achieved or the requirements of a flexible and potentially rapidly operable compressed air supply installation and pneumatic installation can be fulfilled.

Because of the series arrangement of the restrictor and the isolating valve assembly, moreover, the pneumatic connection, in particular the compressed air connection and/or the main pneumatic line and/or the pneumatic line, can be simply and flexibly and yet reliably designed.

According to an embodiment of the present invention, for a controllable isolating valve assembly consisting of at least one control valve of the pneumatic installation or the compressed air supply installation, the isolating valve assembly comprises a first, second and third port, wherein the compressed air reservoir is pneumatically connected to the first port, the compressed air connection is pneumatically connected to the second port and the gallery of the air suspension installation is pneumatically connected to the third port. A pressure chamber of an air spring is advantageously in the form of a bellows.

Such a controllable isolating valve assembly consisting of at least one control valve having three ports can advantageously be provided in a compressed air supply installation or a pneumatic installation or can be disposed at any point in a pneumatic system. Here, the compressed air connection is pneumatically connected to the second port—on the side of the compressed air supply installation. The first port is provided for connecting a compressed air reservoir of the air suspension installation and the third port is provided for connecting a gallery of the air suspension installation. The isolating valve assembly serves, and thus switches, all connections, namely, for the reservoir, gallery and compressed air supply installation, at one point of the pneumatic system. This represents a considerable structural simplification of the conventional systems known from EPI 216 860B1 or EP 1 243 447A or EPI 380 453A1.

Accordingly, a pneumatic system can be provided, in which, according to an embodiment of the invention, a controllable isolating valve assembly consisting of at least one control valve is provided with at least three ports. Here, the compressed air reservoir of the air suspension installation is connected to the first port and the gallery of the air suspension installation is connected to the third port. In addition, the compressed air connection, i.e., the pneumatic connection between the compressed air supply installation and the air suspension installation, is pneumatically connected to the second port. In a closed state of the second port, the pneumatic connection is bidirectionally and fully closed.

According to another embodiment of the present invention, the isolating valve assembly is constructed to adopt at least three switch positions, wherein, in at least one of the switch positions, the second port of the isolating valve assembly can be switched into a closed state, in which the pneumatic line to the dryer is bidirectionally and fully closed.

Bidirectionally fully closed means that a pneumatic connection between the compressed air supply installation and the pneumatic installation is pneumatically tightly closed in a closed state of the second port. This also means that the pneumatic connection in the filling direction, i.e., in a direction from the compressed air supply installation to the pneumatic installation, is thus closed; this is even the case at higher pressures, which would open a non-return valve in the forward direction in prior art constructions. At the same time, the pneumatic connection is also pneumatically tightly closed in a venting direction, i.e., in a direction from the pneumatic installation to the compressed air supply installation. Such an effect is advantageously achieved by creation of the pneumatic connection with a single main pneumatic line and/or pneumatic line between the gallery and the dryer. In particular, a restrictor and the isolating valve assembly can, advantageously, be disposed in a series arrangement in the pneumatic connection. Conventionally, only parallel dispositions of an isolating valve—e.g., in parallel with a non-return valve or a restrictor—are known, so that a pneumatic connection between the compressed air supply installation and the pneumatic installation is pneumatically open at least in one direction, primarily in a filling direction from the compressed air supply installation to the pneumatic installation, by overcoming a switching pressure, e.g., of a non-return valve. It is advantageous to open a compressed air feed and/or a venting connection to the surroundings.

In other words, embodiments of the present invention include a bidirectionally and pneumatically fully closable pneumatic connection between the compressed air supply installation and the pneumatic installation in combination with an isolating valve assembly provided with three ports. This leads to a particularly flexible switching capability of the isolating valve assembly on the one hand, and, on the other hand, to a simply achievable, space-saving and component-saving solution to the decoupling of the pneumatic installation and the compressed air supply installation. For example, superfluous or relatively complex parallel circuits are substantially avoided. Moreover, with a three-port, controllable isolating valve assembly consisting of at least one control valve, at least three compressed air consumers and/or suppliers provided in a single isolating valve assembly can be switched. This relates to the operation of the isolating valve assembly both in throughflow mode and also in isolation mode.

The isolating valve assembly can be implemented simply within an isolating valve unit. This relates in particular to the specific design of the isolating valve assembly in the form of a 3/4-way valve or of a 3/3-way valve or in the form of a combination with two 2/2-way valves. For the latter case, the third port, for the gallery line, is connected between the first and second 2/2-way valves. This has the advantage that only one of the control valves has to be operated for pneumatic coupling or decoupling of the gallery to or from the compressed air supply installation; thus, a reduction in operating complexity is achieved.

In an embodiment, the isolating valve assembly is formed with at least three ports using a first and a second control valve. The first and second control valves of the isolating valve assembly are advantageously 2/2-way valves. Preferably, the first control valve—also referred to below as the primary valve—is implemented as a 2/2-way valve with the function of a level control valve for the compressed air reservoir, i.e., in a reservoir branch line. A reservoir branch line comprises a first control valve as a primary valve and the pneumatic connection, in particular the compressed air connection, comprises a second control valve as a secondary valve. Both control valves are advantageously implemented as 2/2-way valves. In the latter case, it is desirable that the first and second control valves are implemented in the form of a dual armature solenoid valve. This can be implemented relatively simply and in a compact construction. Overall, the first, second and third ports can be implemented relatively simply; namely as a first connection to the first control valve, in particular the primary valve, as a second connection to the second control valve, in particular the secondary valve, and as a third connection between the first and second control valves. The isolating valve assembly implemented in this way can be constructed with simple components, namely 2/2-way valves, at relatively low cost.

In other embodiments, the isolating valve assembly is formed with at least three ports, i.e., with a 3/4-way valve or a 3/3-way valve, which comprises the first, second and third ports. Such an arrangement is relatively compact and simple to control. In particular, a level control valve for a compressed air reservoir can be implemented within the isolating valve assembly in the form of a 3/4-way valve or a 3/3-way valve; and a level control valve for the compressed air reservoir can be omitted, in particular in a reservoir branch line. Finally, the implementation of the isolating valve assembly as a 3/4-way valve or a 3/3-way valve enables a level control valve for the compressed air reservoir to be saved.

In addition to the capability to regulate and/or to control a compressed air flow between the pneumatic installation and the compressed air supply installation by active intervention, inventive embodiments enable considerable energy savings and improved control performance for the compressed air supply installation and/or the pneumatic installation. In particular, the efficiency of regeneration of the air dryer is considerably improved, because this is not occupied with a regeneration operation during each operating function of the pneumatic installation, which may perhaps be incomplete or ineffective. This results in effective operation and overall lower loading of the air dryer and hence an extended operating life of the air dryer or an extended life of the dryer granulate in the air dryer. These and other advantages arise in particular for the case of the redistribution of compressed air in the pneumatic installation and in the case of measurements in the pneumatic installation and in the case of lifting or lowering processes, which can be carried out without a compressed air feed of the compressed air supply installation.

According to a preferred embodiment, the third port is designed as a normally open port. In a de-energized state of the controllable isolating valve assembly, consisting of at least one control valve, this results in a pneumatic connection between a compressed air feed of the compressed air supply installation and a gallery of the air suspension installation being pneumatically open.

The implementation of an isolating valve assembly and/or of a venting valve assembly with a single valve assembly, e.g., as a multi-armature or dual armature solenoid valve, is salutary. In particular, an isolating valve assembly can be implemented within a multi-armature or dual armature solenoid valve assembly. A venting valve assembly can be implemented in the context of a multi-armature solenoid valve or a dual armature solenoid valve assembly. Generally, a primary valve and a secondary valve can be in the form of one valve in a common housing, which comprises a primary armature supporting a first seal element of the primary valve and a secondary armature supporting a second seal element of the secondary valve, which are disposed in a common coil body. The coil body and the armature together form a coil within the magnetic part of the solenoid valve assembly. Advantageously, in a dual armature solenoid valve, the primary armature and the secondary armature pull in sequentially in time, e.g., with increasing control current. Additionally, a valve spring can be implemented for a primary valve or a secondary valve with a different respective spring force, so that the valves pull in time-sequentially, i.e., first the primary valve then the secondary valve. Using an adjustable control current, for which an armature pull-in force exceeds spring forces, the primary valve and the secondary valve can also be activated simultaneously.

For a vehicle system, the controller can be designed to match the control states of the isolating valve assembly and/or of a venting valve assembly to each other. For example, the second and/or third ports of the isolating valve assembly can be normally open. For this state, a venting valve of the venting valve assembly is normally closed. Moreover, the ports of the isolating valve assembly and venting valve assembly can be connected in a complementary manner in the de-energized position. The isolating valve assembly and the venting valve assembly can be controlled with respective separate control lines and with corresponding separate control signals that can be transmitted thereon. A control signal is preferably implemented in the form of a PWM control signal. The venting valve of the venting valve assembly and/or the isolating valve of the isolating valve assembly is/are advantageously implemented in the form of a solenoid valve. Nevertheless, a common controller suitable for both or a corresponding control module can be provided.

Preferably, flow rate can be regulated and/or controlled in throughflow mode at least for the controllable isolating valve assembly—possibly also for the controllable venting valve. The controllable isolating valve assembly can be controlled such that, for the series arrangement with the restrictor, a setting by the controller can be achieved that is advantageous for venting, pressurization and equally for dryer regeneration and the acoustics of the compressed air supply installation. A venting bang can be expected for a compressed air supply installation if an excessive compressed air volume is vented at too high a pressure in too short a time period. In particular, even for relatively rapid venting processes the controllable isolating valve can be regulated and/or controlled in throughflow mode with respect to a flow rate of a compressed air flow in order to achieve a preferred venting behavior.

Preferably, at least one isolating valve of the controllable isolating valve assembly can be switched to an open state for a throughflow mode. Advantageously, at least one isolating valve of the controllable isolating valve assembly can be switched to a closed state for an isolation mode. The pneumatic connection is bidirectionally and fully disconnected in the closed state enabling advantageous—pneumatically sealed—decoupling of the compressed air supply installation and the pneumatic installation for diverse operating modes of the pneumatic installation.

According to an embodiment of the present invention, at least one isolating valve of the controllable isolating valve assembly can be switched between a first control state and a second control state. Here, the first control state is assigned to a closed state of a controllable isolating valve and the second control state is assigned to an open state of a controllable isolating valve. The first and/or second control states can be specified at least for the controllable isolating valve by an electronic controller, e.g., using a suitable control signal conducted via a control line to the controllable isolating valve. The first control state can be designed so that the isolating valve changes fully to the closed state. The first control state can also be designed so that the isolating valve begins to change into the closed state at the start of the switching process without the closed state being reached. Analogously, the second control state can change the controllable isolating valve into the fully open state. The second control state can also be designed so that the controllable isolating valve is partly opened at the start of the switching process and, during the further course of the process, moves towards the fully opened state without the fully opened state being reached. For example, the first and second control states can be designed such that the controllable isolating valve moves dynamically and reciprocally between a fully closed and a fully opened state without becoming fully closed or fully opened. In particular, a control state change can also take place with a suitably selected clock rate.

Advantageously, in a throughflow mode to the second port, the isolating valve assembly can be switched between a first control state assigned to a closed state and a second control state assigned to an opened state, and, in a second control state assigned to an opened state, can be reciprocally switched with a clock rate of a control state change.

The design and matching of first and second control states is advantageous for the implementation of an effective nominal size of a series arrangement of an isolating valve assembly and a restrictor in the pneumatic connection. More specifically, the isolating valve assembly and a restrictor form a series arrangement in the pneumatic connection to the air dryer such that at least one controllable control valve of the isolating valve assembly can be switched into an open state in a throughflow mode and into a closed state in an isolation mode, wherein the first pneumatic connection is bidirectionally and fully closed in the closed state.

A restrictor is basically understood to mean a means of constricting the line cross section of the main pneumatic line. A preferred nominal dimension of the main pneumatic line is greater than 4 mm. The restrictor preferably has an actual nominal dimension greater than 0.6 mm determined by the smallest clear choke cross section. Depending on the line cross section of the main pneumatic line, a choke cross section can be up to 8 mm in size. Preferably, an actual nominal size of the restrictor is between 1 and 3 mm, in particular 2.5 mm. The effective nominal size of the series arrangement of the restrictor and the controllable isolating valve is preferably less than the specified actual nominal size of the restrictor.

Preferably, the restrictor is in the form of a choke that is separate from the isolating valve. In principle, this can be any type of variation of the line cross section of the main pneumatic line or a specially formed restrictor. A restrictor can also be formed in the isolating valve and/or in a further valve, e.g., by an opening of a valve seat of the isolating valve and/or the further valve or another cross-sectional constriction at a point in a pneumatic connection.

According to an embodiment of the present invention, the venting valve is a directly switched valve—part of a solenoid valve assembly for direct switching of a compressed air volume, wherein the solenoid valve assembly does not comprise a control valve. In other words, the solenoid valve assembly is used to implement a directly controlled venting solenoid valve assembly. By directly switching a compressed air volume, the switching time of the directly controlled venting solenoid valve assembly can be less than that of an indirectly controlled venting solenoid valve assembly; this is the case with venting cross-sections of equal size. This has advantages for the venting of the compressed air supply installation during regeneration of the air dryer.

In another embodiment, the venting valve forms an indirectly switched relay valve part of a solenoid valve assembly for indirect switching of a compressed air volume. The solenoid valve assembly then comprises a control valve for controlling the relay valve, the control valve being exposed to a pressure of the main pneumatic line. The pressure can be a total pressure in the main pneumatic line; it can also be a partial pressure of the main pneumatic line (that is, the solenoid valve assembly can be used to implement an indirectly controlled venting solenoid valve assembly). By indirectly switching a total compressed air volume, a control pressure can be kept relatively low. A relatively rapid switching operation of the venting valve can still be achieved by using a total pressure in the main pneumatic line for the control valve.

In one embodiment of the pneumatic installation, at least one air spring, in particular its bellows, is connected to the gallery via at least one bellows branch line. Additionally or alternatively, the compressed air reservoir is connected to the gallery via a reservoir branch line. A gallery is understood to be a gallery line or similar collecting line and/or distribution line, from which at least a bellows branch line branches off, or possibly even a different branch line, such as, e.g., to a pressure sensor or a reservoir; in other words, at least a plurality of bellows branch lines is combined in a collecting and/or distribution line of a gallery type. Moreover, a gallery can comprise a compressed air connection for a pneumatic connection of the air suspension installation to the compressed air supply installation. A gallery is thus a collecting and/or distribution line for the at least one bellows branch line and the compressed air connection.

Preferably, the bellows branch line comprises a level control valve. A level control valve in a branch line has the advantage that the pressure chamber of an air spring can be pneumatically disconnected from the gallery if the level control valve is in a closed state. In a similar function, a reservoir valve in a reservoir branch line can connect a compressed air reservoir. By opening one or a plurality of the level control valves or a reservoir valve, in individual cases—apart from level control—pressure equalization can be carried out between one or a plurality of pressure chambers of the air springs or the compressed air reservoir and the pressure chambers. In particular, redistribution of compressed air between the pressure chambers of the air springs and/or a compressed air reservoir can take place via the gallery. This is also referred to as "cross-linking" of the air springs and/or—more importantly—the compressed air reservoirs. This can present disadvantages in the event that an air dryer of the compressed air supply installation is not shut off from the gallery. This problem is avoided by the controllable isolating valve assembly provided according to embodiments of the present invention, which includes at least one control valve and which is disposed in the pneumatic connection of the air suspension installation to the compressed air supply installation. The pneumatic installation can, however, also be operated in any other operating state independently of the compressed air supply installation, e.g., by cross-linking, because the isolating valve assembly offers the option of decoupling the pneumatic installation and the compressed air supply installation from each other by bidirectional and full closure of the pneumatic connection.

A level control valve can be advantageously formed as a 2/2-way valve. Depending on the implementation of the controllable isolating valve assembly consisting of at least one control valve, a level control valve or reservoir valve in the form of a 2/2-way valve—whether it is for an air spring or for a compressed air reservoir—can also be implemented as part of the controllable isolating valve assembly.

A preferred embodiment of the compressed air supply installation provides the isolating valve assembly as the only valve assembly in the only main pneumatic line between the air dryer and the compressed air connection, in particular between the air dryer and the gallery line.

Preferably, in the compressed air supply installation and/or the pneumatic system:

(a) the isolating valve assembly is formed by means of a first control valve and a second control valve, wherein the third port is pneumatically connected between the first control valve and the second control valve, or (b) the isolating valve assembly is formed by a 3/4-way valve, or (c) the isolating valve assembly is formed by a 3/3-way valve.

In an embodiment of the compressed air supply installation, the venting valve is a directly switched valve part of a solenoid valve assembly for direct switching of a compressed air volume.

In another embodiment of the compressed air supply installation, the venting valve is an indirectly switched relay valve, part of a solenoid valve assembly for indirect switching of a compressed air volume, wherein the solenoid valve assembly comprises a control valve exposed to a pressure of the main pneumatic line and for controlling the relay valve.

Preferably, in the compressed air supply installation and/or the pneumatic system, it is also provided that the third and/or second port is/are connected in a pneumatically open connection in the de-energized state of the isolating valve assembly.

Also, it is preferable that, in a first operating mode, the pneumatic connection between the gallery line and the air dryer is bidirectionally and fully closed, wherein a pressure measurement and/or cross-linking of a reservoir and/or a bellows can be carried out in the pneumatic installation without the air dryer of the compressed air supply installation being exposed to compressed air.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is described in greater detail below using exemplary embodiments on the basis of the accompanying drawings, in which:

FIGS. 3B, 3C, and 3D show modified embodiments of the isolating valve assembly of FIG. 3A, each in the form of a dual armature solenoid valve, with the first 2/2-way valve as the primary valve and the second 2/2-way valve as the secondary valve, and wherein three different switching states of the dual armature solenoid valve are shown;

In the drawing figures, the same reference characters are used for identical or similar parts or parts of identical or similar function, where suitable.

Figure 1:
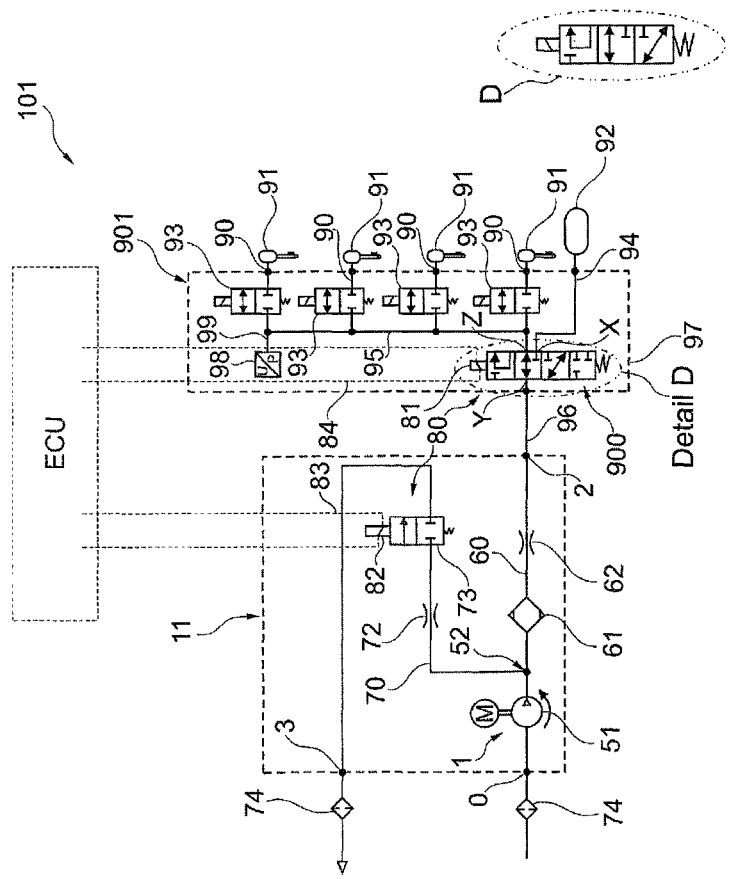
FIG. 1 is a circuit diagram of a pneumatic system with a compressed air supply installation according to a preferred embodiment, in which a single venting valve of a directly switched solenoid valve directly switches a compressed air volume, and wherein the isolating valve assembly with three ports X, Y, Z is formed by a 3/4-way valve and is integrated in a valve block of a pneumatic installation (in Detail D according to another embodiment, the isolating valve assembly with three ports X, Y, Z can be formed by a 3/3-way valve)

LIST OF REFERENCE CHARACTERS 0 air feed
1 compressed air feed
2 compressed air connection
3 venting connection
11, 21, 31, 41 compressed air supply installation
   51 air compressor
   52 compressed air supply connection
60 main pneumatic line
61 air dryer
62 first choke (restrictor)
   70 venting line
   71 non-return valve
   72 second choke
73, 173 venting valve
74 filter
80, 180 solenoid valve assembly
   81 first coil
   82 second coil
   83 third control line
   84 fourth control line
84.1, 84.2 first control line, second control line
   90 bellows branch line
   91 bellows
   92 reservoir
   93 solenoid valve
   94 reservoir branch line
   95 gallery line
   96 further pneumatic line
97, 97" valve block
97' four-fold valve block
98 voltage pressure sensor
99 sensor branch line
101, 201, 301, 302, 401, 402 pneumatic system
160 control branch line
170 venting branch line
175 control valve
700, 800, 800', 900 isolating valve assembly
801, 801' first control valve
802, 802' second control valve
901, 902, 903, 904, 905 pneumatic installation
M motor
   X first port
   Y second port
   Z third port
   I primary valve
II secondary valve
Ia, IIa seal element
Ib primary armature
IIb secondary armature
Ic, IIc valve spring
Id, IId valve seat
III coil body

DETAILED DESCRIPTION OF THE PREFERRED EMBODIMENTS

FIG. 1 shows a pneumatic system 101 with a compressed air supply installation 11 and a pneumatic installation 901 in the form of an air suspension installation. The air suspension installation comprises a number of bellows 91, each of which is assigned to a wheel of a vehicle and forms an air spring of the vehicle. Moreover, the air suspension installation comprises a reservoir 92 for storing rapidly available compressed air for the bellows 91. A solenoid valve 93 is disposed upstream of each bellows 91 in a bellows branch line 90 and each acts as a level control valve for opening or closing an air spring formed by a bellows 91. The solenoid valves 93 in the bellows branch lines 90 are 2/2-way valves. A separate solenoid valve as a reservoir valve can be disposed upstream of the reservoir 92 in a reservoir branch line 94, its function being undertaken in this case by an isolating valve assembly 900. The solenoid valves 93 are connected by means of the bellows branch lines 90 to a gallery line 95, which forms a common pneumatic collecting line. The gallery line 95 is pneumatically connected via a further pneumatic line 96 to form a pneumatic connection to a compressed air port 2 of the compressed air supply installation 11. In the present case, the pneumatic installation 901 is provided with a pressure sensor 98, which is connected via a further sensor branch line 99 to the gallery line 95 so that a pressure in the gallery line 95 of the pneumatic installation 901 can be measured by the pressure sensor 98. A pressure sensor 98 can be attached to the gallery line 95, as with the pneumatic installations 901, 903, 904, or can even be attached to the reservoir 92 as with the pneumatic installation 902. The solenoid valves 93 are disposed in a valve block 97 with five valves together with the single solenoid 3/4-way valve of the isolating valve assembly 900. The solenoid valves 93 are shown in FIG. 1 in a de-energized state—the solenoid valves 93 are formed as normally closed solenoid valves. Other modified embodiments can implement a different disposition of the solenoid valves 93—for example, fewer solenoid valves can be used within the valve block 97. The present, relatively compact, isolating valve assembly 900 disposed together with the solenoid valves 93 in the five-fold valve block 97 is part of the pneumatic installation 901; an isolating valve can be designed differently within the scope of the invention, and can be disposed elsewhere in the pneumatic connection to the compressed air supply installation 11.

The compressed air supply installation 11 is used to operate the pneumatic installation 901. The compressed air supply installation 11 comprises a compressed air feed 1 and a compressed air port 2 to the pneumatic installation 901. The compressed air feed 1 is formed here with an air feed 0, an air compressor 51 and a compressed air supply connection 52 in the form of a suitable interface. The air feed 0 can be disposed upstream of a filter. The air compressor 52 is driven by a drive, in the present case in the form of a motor M. The pneumatic connection between the compressed air supply installation 11 and the pneumatic installation 901 is formed here by a single main pneumatic line 60 and a continuation pneumatic line 96 connected in series therewith; the pneumatic connection thus connects, on the one hand, to the compressed air supply connection 52 to the air feed 1 and, on the other hand, via the isolating valve assembly 900 to the gallery line 95. In between the pneumatic connection are an air dryer 61 and a first choke 62. A controllable isolating valve assembly 900 is formed with a solenoid valve as a 3/4-way valve. The choke 62 and the isolating valve assembly 900 form a pneumatic series arrangement in the pneumatic connection, namely in the main pneumatic line 60 with the compressed air connection 2 and the further pneumatic line 96.

Furthermore, the compressed air supply installation 11 comprises a further pneumatic connection to the main pneumatic line 60 and a venting connection 3 to the surroundings, namely the venting line 70. In the present case, the separate venting line 70 is connected to the compressed air supply connection 52 to the main pneumatic line 60. A second choke 72 and a controllable—here a normally closed—venting valve 73 are disposed in the venting line in the direction of the venting connection 3. A filter 74 is disposed downstream of the venting connection 3 to the surroundings. The compressed air supply installation 11 shown in FIG. 1 provides the venting valve 73 as a single and directly switched valve for directly switching a compressed air volume in the venting line 70. An additional control valve is not provided in the compressed air supply installation 11.

The venting valve 73 is part of a solenoid valve assembly 80 formed with the isolating valve assembly 900. The solenoid valve assembly 80 provides a first coil 81 for the controllable isolating valve 900 and a second coil 82 for the controllable venting valve 73 that is formed separately from the first coil 81. In particular, the first coil 81 and the second coil 82 are each formed with a separate coil body and, in the present case, with separate control lines 83, 84—referred to here as third and fourth control lines. The third and fourth control lines 83, 84 are connected to the vehicle controller ECU of a vehicle.

The isolating valve assembly 900 is, in the present case, a 3/4-way valve implemented as a solenoid valve and has a first port X, a second port Y and a third port Z. The reservoir 92 is pneumatically connected to the first port X via the reservoir branch line 94. The compressed air connection 2 is pneumatically connected via the further pneumatic line 96 to the second port Y. The gallery line 95 is pneumatically connected to the third port Z. The isolating valve assembly 900 thus comprises three ports, to which—depending on the operating state of the pneumatic system 101—components acting as compressed air recipients or compressed air feeds are commonly pneumatically connected, so that they can be switched together via the isolating valve assembly 900 in a single component. In the present case, the components comprise a reservoir 92 (connection via the reservoir branch line), a compressed air supply installation 11 (connection via the further pneumatic line 96 and the compressed air connection 2) and the bellows 91 as well as the pressure sensor 98 (connection via the gallery line 95). The isolating valve assembly 900 can also adopt different control states, which are associated with different operating states of the pneumatic installation 901 and which are explained in detail for the pneumatic system 101 in relation to FIG. 7, FIG. 9, and FIG. 11—as representative—of diverse embodiments of the present invention.

The pneumatic system 101 or the pneumatic installation 901 in the form of an air suspension installation can also be constructed with a different isolating valve assembly 700, as illustrated in FIG. 9C by way of example. The isolating valve assembly 700 shown there is constructed with a solenoid valve as a 3/3-way valve and is particularly suitable for a pneumatic installation 902 of FIG. 9C, in which the pressure sensor 98 is provided for pressure measurement via a sensor branch line 99 directly connected to the reservoir 92—i.e., not via the gallery line 95, but directly to the reservoir 92. The isolating valve assembly 700 also comprises three ports X, Y, Z, respectively, for a reservoir branch line 94 to a reservoir 92, a pneumatic line 96 to a compressed air connection 2 of a compressed air supply installation and to a gallery line 95. In principle, the description relating to the embodiments with a 3/4-way valve of FIG. 1, FIG. 2 and FIG. 5 can also apply to embodiments with a 3/3-way valve, where this is shown as Detail D. The switching state existing for a 3/4-way valve, in which all three ports X, Y, Z are blocked, can be omitted for the 3/3-way valve if, as in FIG. 9C, the pressure sensor 98 is connected directly to the reservoir instead of to the gallery line 95.

Figure 2:
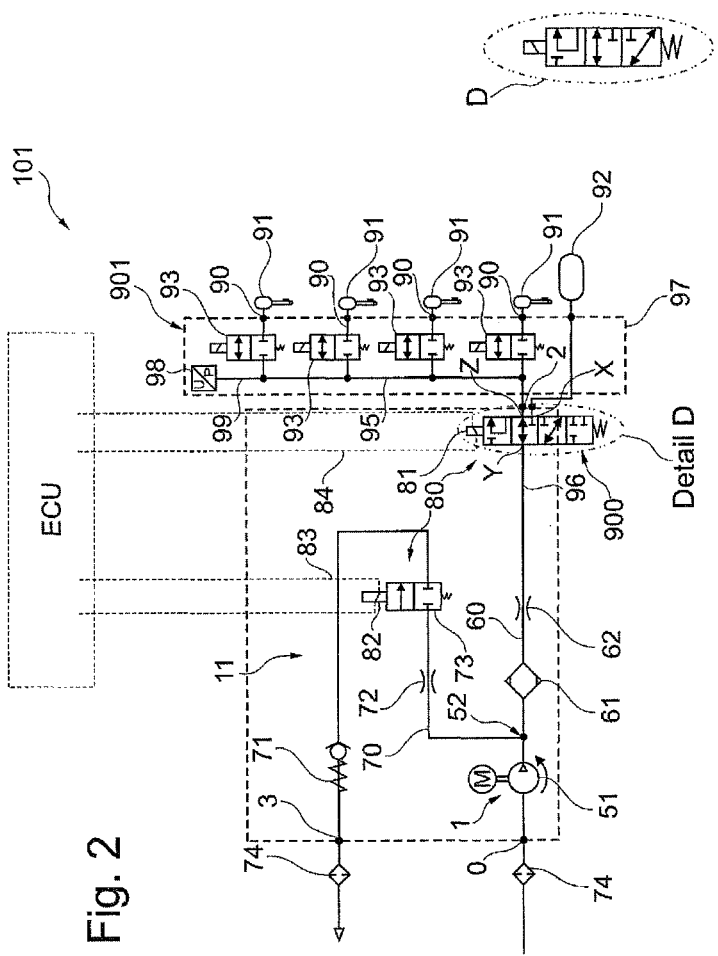
FIG. 2 is a circuit diagram of a pneumatic system modified in relation to the 3/4-way valve of FIG. 1, whereby the 3/4-way valve is integrated in the compressed air supply installation (in Detail D according to another embodiment, the isolating valve assembly with three ports X, Y, Z can be formed by a 3/3-way valve)

FIG. 2 shows a slightly modified embodiment of a pneumatic system 201 with a compressed air supply installation 21 and a pneumatic installation 903. Reference is only made below to the differences of the pneumatic system 201 compared to the pneumatic system 101. FIG. 2 first shows the venting valve 73 in a normally open variant. A non-return valve 71 in the venting line 70 is disposed upstream of the venting connection 3 in the venting direction, which is advantageous for closing the compressed air supply installation 21 relative to the surroundings. The pneumatic systems 101, 201 differ in that the otherwise identical isolating valve assembly 900 is not—as for the pneumatic installation 901—disposed within a valve block 97', but is rather implemented separately from the solenoid valves 93. The solenoid valves 93 of the pneumatic installation 903 are disposed, in the present case, in a four-fold solenoid valve block 97' and form respective air springs together with the bellows 91. The air springs and the reservoir 92 together with the pressure sensor 98 form the components of the pneumatic installation 903 connected to the gallery line 95. The isolating valve assembly 900 is disposed in the pneumatic system 201 of FIG. 2 either as part of the compressed air supply installation 21 in the main pneumatic line 60 or—as shown in the present case—in the further pneumatic line 96, namely, in a series arrangement with the air dryer 61, the choke 62 and the compressed air connection 2. In the present case, the 3/4-way valve is implemented separately from the compressed air supply installation 21 and separately from the pneumatic installation 905.

Figure 7:
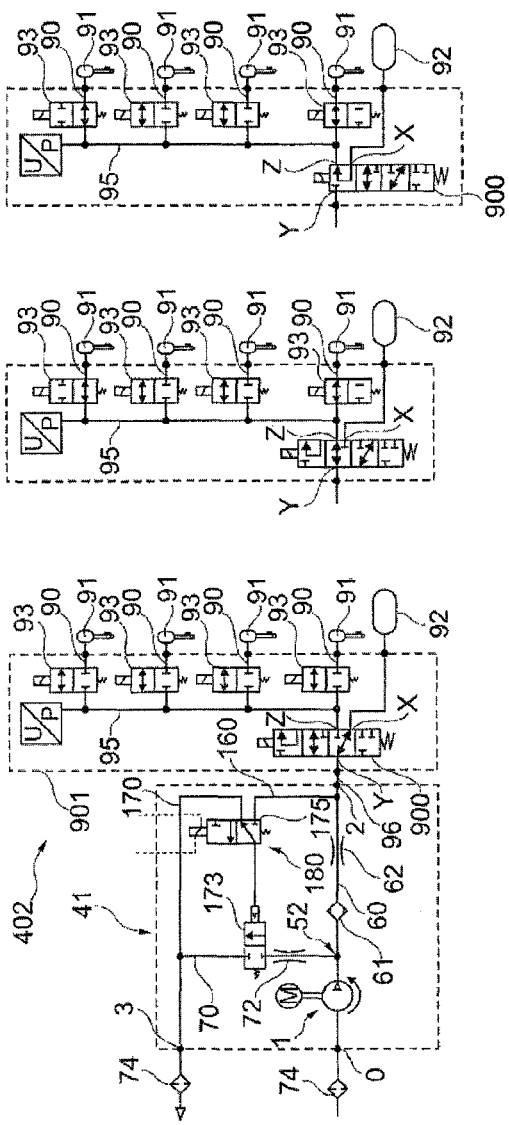
FIG. 7 illustrates different operating states A, B, C of a pneumatic system of FIG. 5 for filling the pneumatic installation.
Figure 9:
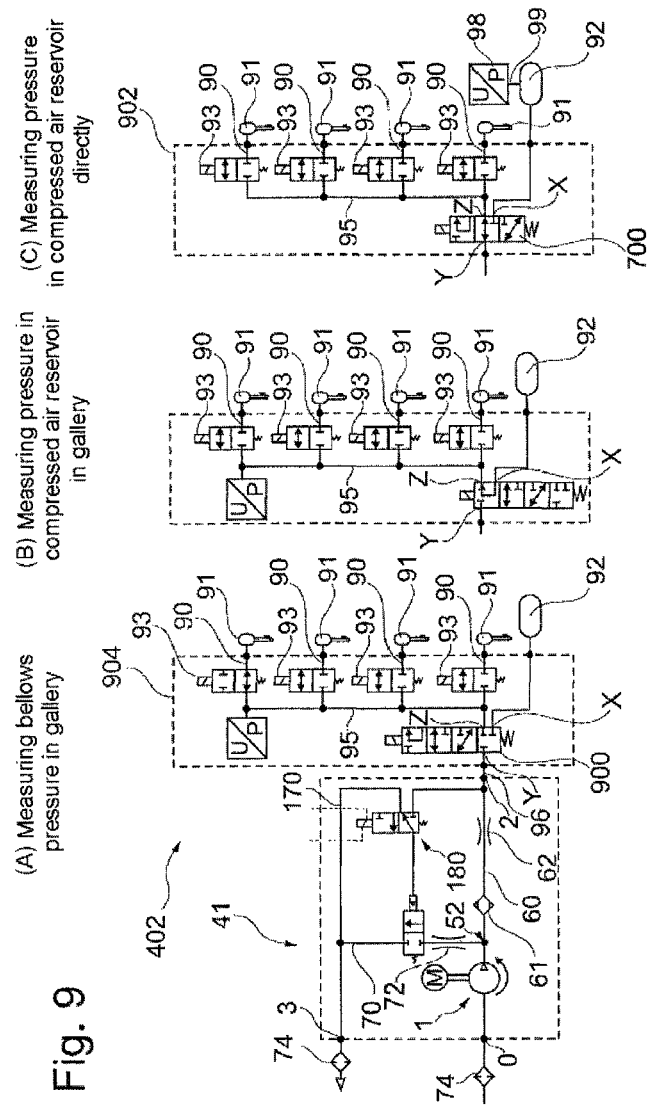
FIG. 9 illustrates different operating states A, B, C of a pneumatic system of FIG. 5 for measuring or cross-linking in the pneumatic installation.
Figure 11:
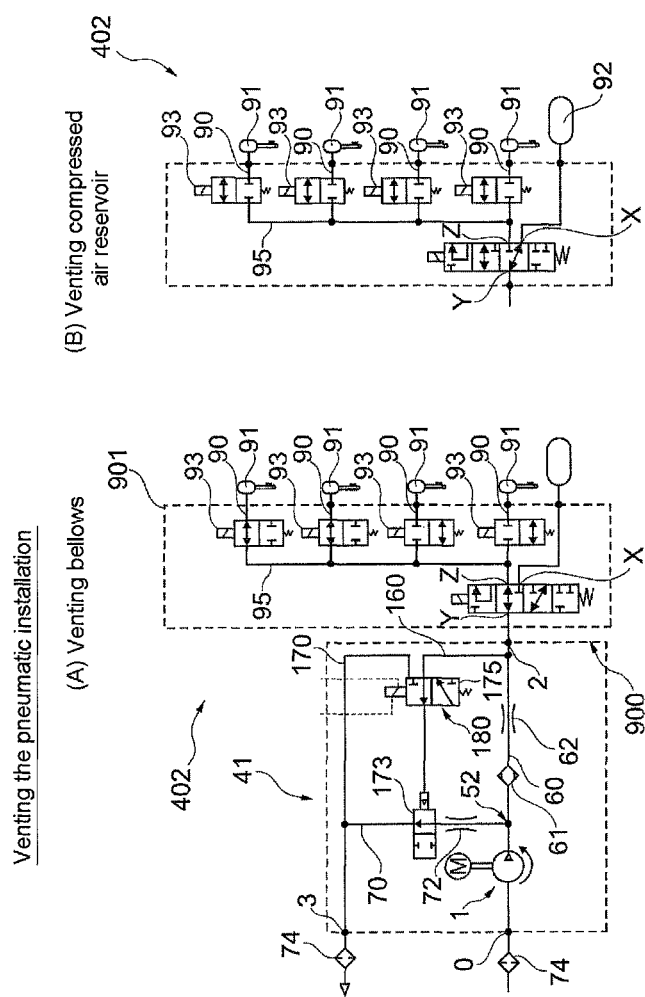
FIG. 11 illustrates different operating states A, B of a pneumatic system of FIG. 5 for venting the pneumatic installation.

In this alternative embodiment, the pneumatic installation 903 does not comprise the isolating valve assembly 900, but rather the isolating valve assembly 900 is disposed in a series arrangement in the main pneumatic line 60 of the compressed air supply installation 21, i.e., between the choke 62 and the compressed air connection 2. The isolating valve assembly 900 comprises, in turn, a second port Y, to which the compressed air connection 2 of the compressed air supply installation 21 is directly connected. The first port X is, in turn, provided for connecting a reservoir 92 of the pneumatic installation 903. The third port Z is, in turn, provided for connecting a gallery line 95 of the pneumatic installation 903. The operating positions of the isolating valve assembly 900 shown by way of example of operating states of the pneumatic system, as shown in FIG. 7, FIG. 9 and FIG. 11, also apply to the pneumatic system shown in FIG. 2.

Figure 3A:
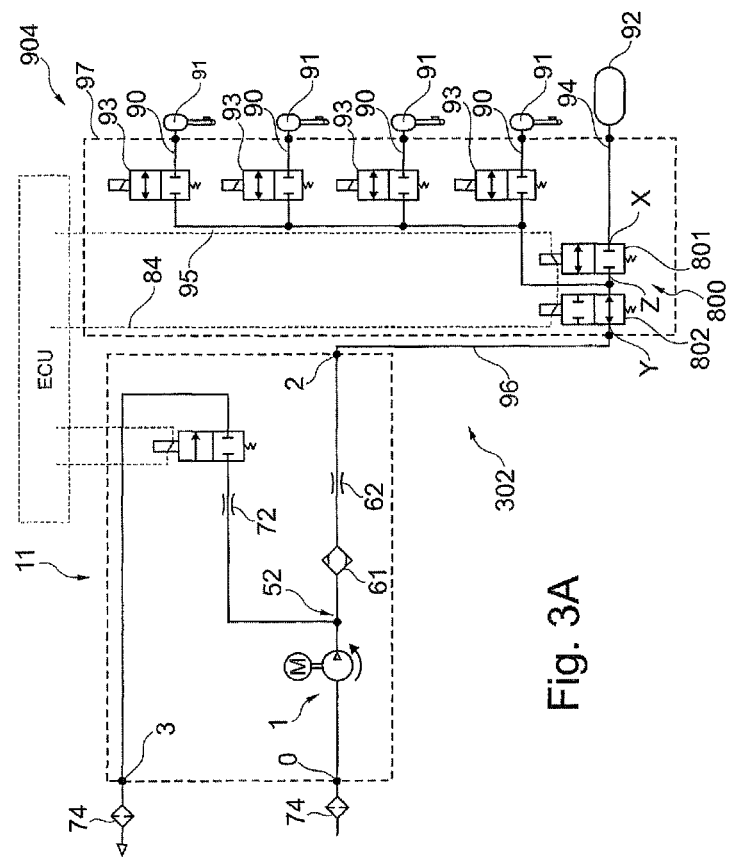
FIG. 3A is a circuit diagram of a pneumatic system with a compressed air supply installation according to an embodiment of the present invention in which a single venting valve of a directly switched solenoid valve directly switches a compressed air volume and wherein the isolating valve assembly with three ports X, Y, Z is formed by a first 2/2-way valve and a second 2/2-way valve and is integrated in a valve block of a pneumatic installation.

FIG. 3A shows a pneumatic system 302 with a compressed air supply installation 11 as already described with reference to FIG. 1, and with a pneumatic installation 904, which is shown, in the present case, without pressure sensor 98. For the compressed air supply installation 11, reference is made to the description of FIG. 1. For the pneumatic installation 904, in the present case, an isolating valve assembly 800 is provided. For the same design of pneumatic installation 904, up to the isolating valve assembly 800 and a pressure sensor 98, reference is made to the description of the pneumatic installation 901 in FIG. 1. In the present case, the isolating valve assembly 800 again comprises three ports X, Y, Z. The isolating valve assembly 800 is formed using a first control valve

801, here, in the form of a 2/2-way valve—also referred to as primary valve I below—and a second control valve 802, here, in the form of a 2/2-way valve—also referred to below as secondary valve II. The reservoir 92 is connected to the first control valve 801 via the first port X. The compressed air connection 2 of the compressed air supply installation 11 is connected via the second port Y and via the further pneumatic line 96 to the second control valve 802. The gallery line 95 of the pneumatic installation 904 is connected to the third port Z formed between the first and second control valves 801, 802.

The isolating valve assembly 800 formed—as a 3/4-way valve or a 3/3-way valve—by the two control valves 801, 802 also enables the common switching of the compressed air connection 2, of the reservoir 92 and of the gallery line 95 with a single isolating valve assembly 800 using three ports X, Y, Z.

FIG. 3B, FIG. 3C, and FIG. 3D show, in relation to each other, respectively, the isolating valve assembly 800, on the one hand, in View (ii) and, on the other hand, in View (i) as a dual armature solenoid valve. In the present case, a functional position of the isolating valve assembly 800 is shown in View (ii). In addition, a functional position of the dual armature solenoid valve respectively associated with the functional position of the isolating valve assembly 800 is shown in View (i), with which the solenoid valve assembly 800 can be implemented particularly advantageously. The switch positions (A), (B), (C) shown in FIG. 3B, FIG. 3C, and FIG. 3D clearly show different pneumatic couplings of the air dryer 61, of the reservoir 92 and of the bellows 91 depending on the operating state of the pneumatic installation 904 or of the pneumatic system 302. The operating states are also illustrated in detail by way of example with different functional positions of an isolating valve assembly 800 in FIG. 8, FIG. 10 and FIG. 12.

The first and second control valves 801, 802 are referred to in FIG. 3B as primary valve I or secondary valve II, respectively. The primary valve I comprises a first seal element Ia and a primary armature Ib, to which the first seal element Ia is attached. In View (A) the first seal element Ia sits on a valve seat Id and is held there by a valve spring Ic. The thus closed valve seat Id causes the closed position of the first control valve 801 (primary valve I), as symbolically shown in View (ii) of View (A) of FIG. 3B.

Furthermore, it can be seen in View (A) of FIG. 3B that a secondary armature IIb for the secondary valve II in the dual armature solenoid valve is provided with a second seal element IIa, wherein the second seal element II is lifted from valve seat IId by the valve spring IIc in the functional position of the dual armature solenoid valve shown in View (A) of FIG. 3B. This position occurs without energizing the common coil body III for primary valve I and secondary valve II. In the position thus shown with primary and secondary armatures Ib, IIb dropped, the first control valve 801 (primary valve I) is normally closed and the second control valve 802 (secondary valve II) is normally open. A pneumatic installation 904 can thus be used for level control installations to carry out possibly frequent venting, lowering or raising from the compressed air feed 1 with switching of bellows valves 93 without having to operate the isolating valve assembly 800.

When energized, the coil body III acts inductively on the secondary armature IIb and the second seal element IIa is pressed onto the valve seat IId against the force of a valve spring IIc. When energized, the coil body III also acts inductively on the primary armature Ib and the first seal element Ia is lifted from the valve seat Id against the force of a valve spring Ic.

View (B) of FIG. 3C shows the dual armature solenoid valve in View (i) when energized, wherein only the primary armature Ib is now moved and the first seal element Ia is lifted from the valve seat Id. In the functional position thus shown, both the first control valve 801 (primary valve I) and the second control valve 802 (secondary valve II) are opened. For such a functional position of the isolating valve assembly 800, a bellows valve 93 is advantageously closed.

If the current in the coil body III falls below a holding current for the secondary valve II, but the current is above a switching current of the primary valve I, the functional position of View (C) of FIG. 3D occurs, in which the secondary valve II is closed and the primary valve I is opened—assuming full energizing current. In other words, as can be seen from View (i) of FIG. 3D, the primary armature Ib is in a position in which the first seal element Ia is lifted from valve seat Id. The secondary armature IIb is in a position in which the second seal element IIa is seated on the valve seat IId. This functional position has the advantage that a bellows 91 can be filled from the reservoir 92 and the air dryer 61 in the compressed air supply installation 11 is still shut off. Such a refilling action thus does not adversely affect the air dryer 61.

The current limits for switching currents, holding currents or restoring currents of the primary valve I and secondary valve II can be suitably matched with respect to the spring forces of the valve springs Ic, IIc. Induction forces on the primary armature Ib and secondary armature IIb can be matched against spring forces such that the primary valve I and the secondary valve II are suitably switched when the coil body III is energized. Therefore, a common control line 84 for the primary valve I and the secondary valve II identifiable in FIG. 3A and referred to as a fourth control line can be occupied by a common control signal for the first control valve 801 and the second control valve 802. In this design, the isolating valve assembly 800 is implemented as a dual armature solenoid valve relatively simply and with similar compactness to the isolating valve assembly 900 or 700.

Figure 4:
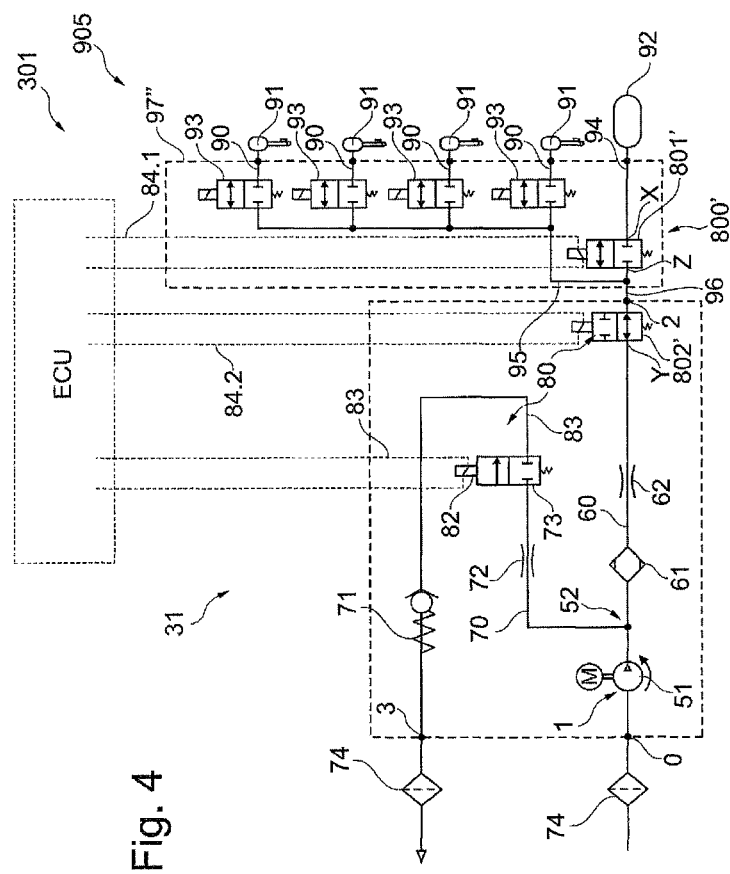
FIG. 4 is a circuit diagram of a pneumatic system modified in relation to the system of FIG. 3A implemented with two 2/2-way valves, wherein one of the 2/2-way valves is integrated in the compressed air supply installation and the other is integrated in a valve block.

FIG. 4 shows an embodiment of a pneumatic system 301 modified compared to FIG. 3A with a compressed air supply installation 31 and a modified pneumatic installation 905. The pneumatic system 301 comprises, in contrast to the pneumatic system 302 of FIG. 3A, a modified isolating valve assembly 800'-again, with a first control valve 801' and a second control valve 802'. In contrast to pneumatic system 302 of FIG. 3A, the first control valve 801' and the second control valve 802' are not implemented as a dual armature solenoid valve. Rather, in the present case, a separate first and second control line 84.1 or 84.2 is provided for each of the control valves 801', 802'. Moreover, the control valves 801', 802' are formed as separate 2/2-way valves. The first control valve 801' is implemented as part of a five-fold valve block 97" together with the further solenoid valves 93—i.e., as part of the sequence of five 2/2-way valves in the five-fold valve block 97". However, the second control valve 802' is disposed in the main pneumatic line 60 on the other side of the compressed air connection 2 in the compressed air supply installation 31. In the embodiment shown here, the second control valve 802' is thus assigned to the compressed air supply installation 31 and is disposed in the main pneumatic line 60 itself, in the present case, between the choke 62 and the compressed air connection 2, like with the 3/4-way valve of FIG. 2.

In other embodiments, the second control valve 802' can instead be formed in the further pneumatic line 96 to the compressed air connection 2 to the pneumatic installation 905 or even separately from the pneumatic installation 905. Otherwise, the compressed air supply installation 31 is designed as is the compressed air supply installation 11 of FIG. 1, so that, here, reference is made to the description of the compressed air supply installation 11. For a venting process from the reservoir 92 of the pneumatic installation 905, the pneumatic system 301 shown in FIG. 4 thus provides three 2/2-way valves to conduct a flow—namely, the first control valve 801' as part of the isolating valve assembly 800' in the pneumatic installation 905 and as part of the valve block 97" and the second control valve 802' as part of the isolating valve assembly 800', whether in the main pneumatic line 60 or in the further pneumatic line 96, and finally the venting valve 73 in the compressed air supply installation 31. In the present case, all three 2/2-way valves are connected to the ECU via separate control lines—namely, the first control line 84.1, the second control line 84.2 and the third control line 83.

In a modified implementation, the venting valve 73 and the second control valve 802' of the isolating valve assembly 800' can be implemented in a relatively compact manner in the form of a dual armature solenoid valve, wherein both the venting valve 73 and also the second control valve 802' are in a common coil body and can be controlled via a common control line.

Figure 5:
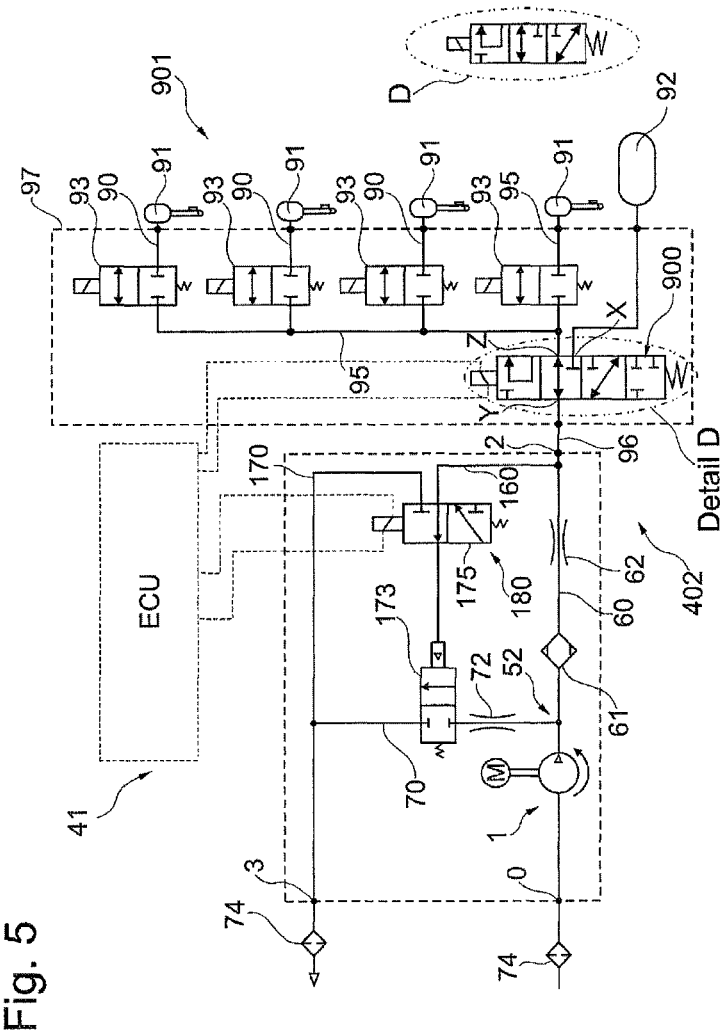
FIG. 5 is a circuit diagram of a pneumatic system with a compressed air supply installation according to an embodiment of the present invention in which the venting valve is an indirectly switched relay valve, part of a solenoid valve assembly for indirect switching of a compressed air volume, and wherein the solenoid valve assembly comprises a control valve for controlling the relay valve, the control valve being subjected to a total pressure of the main pneumatic line, and wherein the isolating valve assembly with three ports X, Y, Z is formed by a 3/4-way valve and is integrated in a valve block of a pneumatic installation (in Detail D according to another embodiment, the isolating valve assembly with three ports X, Y, Z can be formed by a 3/3-way valve)

FIG. 5 shows a further embodiment of a compressed air supply installation 41 as part of a pneumatic system 402 for supplying a pneumatic installation 901. The differences with respect to the compressed air supply installations 11, 21, 31 are described herein. The compressed air supply installation 41 comprises a main pneumatic line 60 and a venting line 70. An air dryer 61 and a first choke 62 are disposed in the main pneumatic line 60, like with the embodiments discussed above. The controllable isolating valve 900 and the choke 62 form a series arrangement in the pneumatic connection between the pneumatic installation 901 and the compressed air supply installation 41 such that the pneumatic connection can be bidirectionally and fully closed for a compressed air flow. At the same time, all components—compressed air supply installation 11, reservoir 92 and bellows 91—can be flexibly switched via three ports X, Y, Z. The venting line 70 is connected to the main pneumatic line 60 via a compressed air supply connection 52 and comprises a controllable venting valve 173 between the compressed air supply connection 52 and the venting connection 3. In contrast to the embodiments discussed above, the venting valve 173 is part of a solenoid valve assembly 180 for indirect switching of a compressed air volume. Here, the venting valve 173 is in the form of an indirectly switched relay valve part of the solenoid valve assembly 180, which is controlled by a control valve 175. The control valve 175 is, in the present case, subjected to a total pressure of a pressure flow in the main pneumatic line 60 via a control branch line 160 branching off from the main pneumatic line 60. Depending on the design of the first choke 62, the control valve 175 can also be subjected to a partial pressure of the main pneumatic line 60.

In particular, a control valve 175 for controlling the relay valve 173 and subjected to only a minimal pressure, enables relatively rapid venting of the compressed air supply installation 41, because a pilot pressure is relatively low. In the present case, the control valve 175 of the solenoid valve assembly 180 is in a normally open state. The venting valve 173 is in a preliminary state. It only then requires a minimal operating pressure dependent on the configuration to displace the venting valve 173 into the open state. It is advantageous with a rapidly vented solenoid valve assembly 180 that, because of the relatively small nominal size of the first choke 62, only a low partial pressure of the compressed air volume is necessary in the main pneumatic line 60 to control the venting valve 173 via the control valve 175. Nevertheless, the main pressure volume is vented via the venting line 70 and the choke 72 as well as the relay valve 173 to the venting connection 3. An advantage of the rapidly vented solenoid valve assembly 180 with the compressed air supply installation 41 is that the entire compressed air volume does not have to be switched by a single solenoid valve, but only a low partial pressure of a compressed air volume via the control branch line 160 to the control valve 175 is sufficient. This design as a positively controlled valve assembly enables an increase of the operating pressure to a relatively high pressure level. At the same time, the switching of high compressed air volumes by the venting valve 173 is rendered possible. The venting valve 173, acting as a relay valve, can be designed with a relatively large nominal size. Moreover, the ratio of the nominal size of the first choke 62 to the nominal size of the second choke 72 is formed so that effective regeneration of the air dryer 61 is still possible during venting of the compressed air supply installation 41.

In the closed state, the control valve 175 is open via the venting branch line 170 to the venting connection 3, wherein the further venting branch line 170 is combined with the venting line 70 before the venting connection 3.

Otherwise, the function of the compressed air supply installation 41 with respect to the isolating valve 900 and the venting valve 173 is analogous to the operation of the previously discussed compressed air supply installations 11, 21, 31. A pneumatic installation 901 is connected to the compressed air supply installation 41 via the compressed air connection 2 and the further pneumatic line 96 in the manner illustrated in FIG. 1. Reference is made to the description of FIG. 1 for the description of the pneumatic installation 901.

Figure 6:
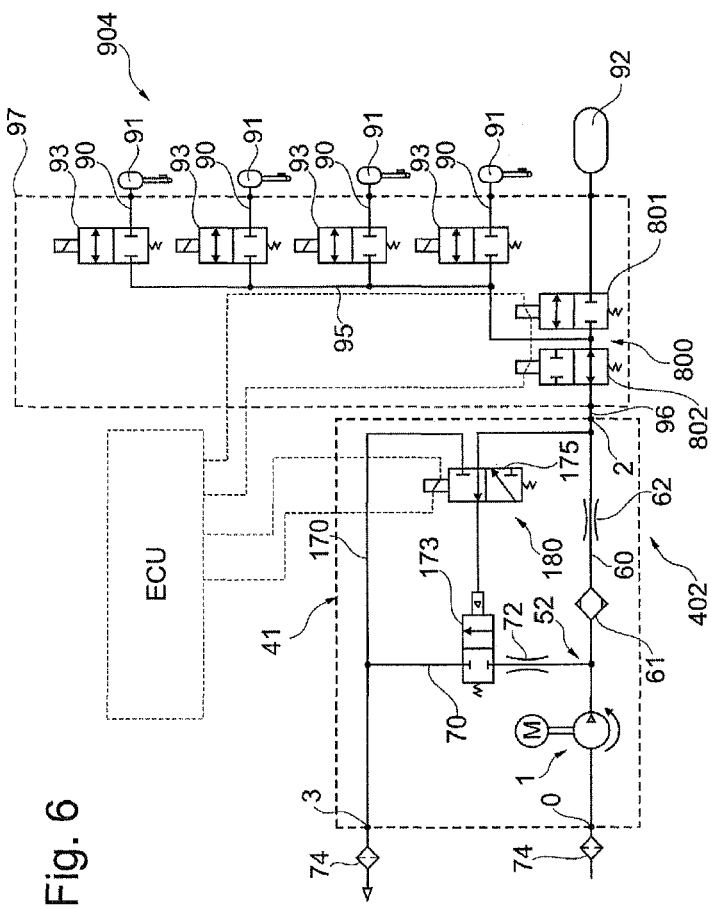
FIG. 6 is a circuit diagram of a pneumatic system with a compressed air supply installation according to an embodiment of the present invention in which the venting valve is an indirectly switched relay valve, part of a solenoid valve assembly for indirectly switching a compressed air volume, wherein the solenoid valve assembly comprises a control valve for controlling the relay valve, the control valve being exposed to a total pressure of the main pneumatic line, and wherein the isolating valve assembly with three ports X, Y, Z is formed by a first 2/2-way valve and a second 2/2-way valve and is integrated in a valve block of a pneumatic installation.

FIG. 6 shows a pneumatic system 401 with a compressed air supply installation 41, as in FIG. 5, and a pneumatic installation 904, as in FIG. 3A. Suitable reference is made to the corresponding illustrative parts of FIG. 3A and FIG. 5. In particular, the current amplitudes for the switching currents can be selected analogously in relation to the isolating valve 800—namely, primary valve I (first control valve 801) and secondary valve II (second control valve 802)—and the control and relay valve assembly of the control valve 175 and the venting valve 173.

Figure 10:
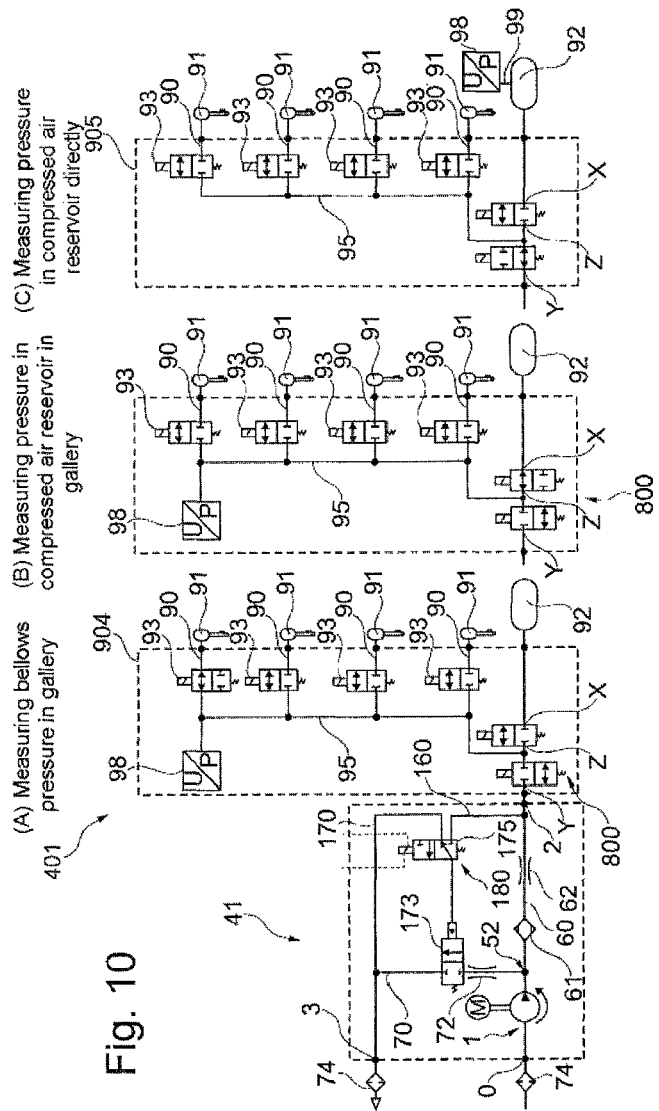
FIG. 10 illustrates different operating states A, B, C of a pneumatic system of FIG. 6 for measuring or cross-linking in the pneumatic installation.
Figure 12:
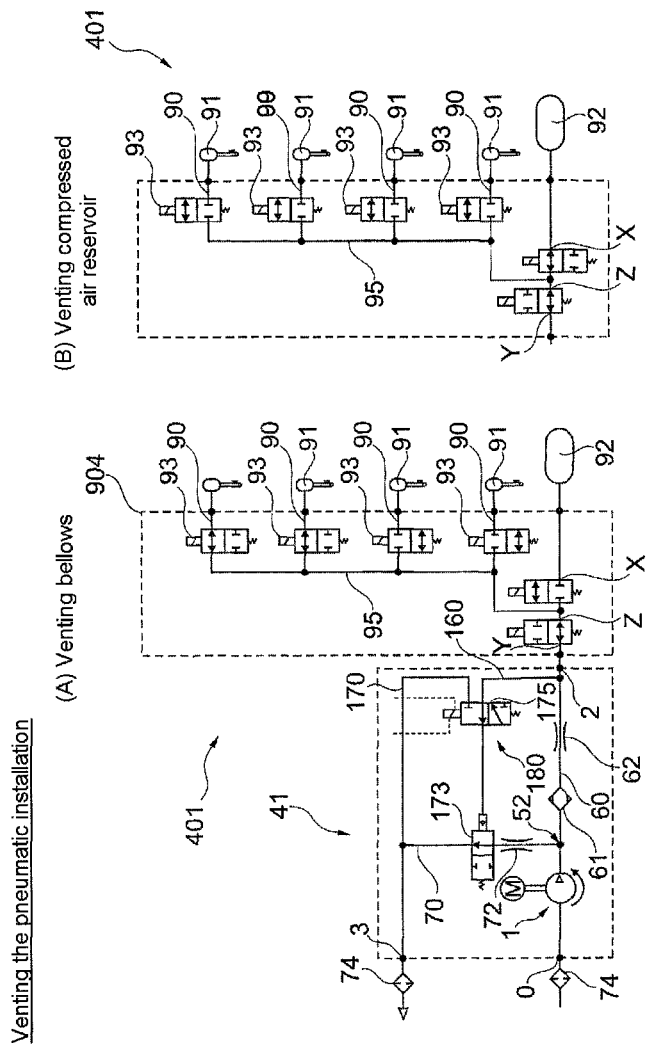
FIG. 12 illustrates different operating states A, B of a pneumatic system of FIG. 6 for venting the pneumatic installation.

The functional positions of an isolating valve assembly 900 are illustrated in FIG. 7, FIG. 9, and FIG. 11 for different operating positions of the pneumatic system 402 shown in FIG. 5. The functional positions of the isolating valve assembly 800 shown in FIG. 8, FIG. 10, and FIG. 12 are shown in relation to a pneumatic system 401 of FIG. 6.

Figure 8:
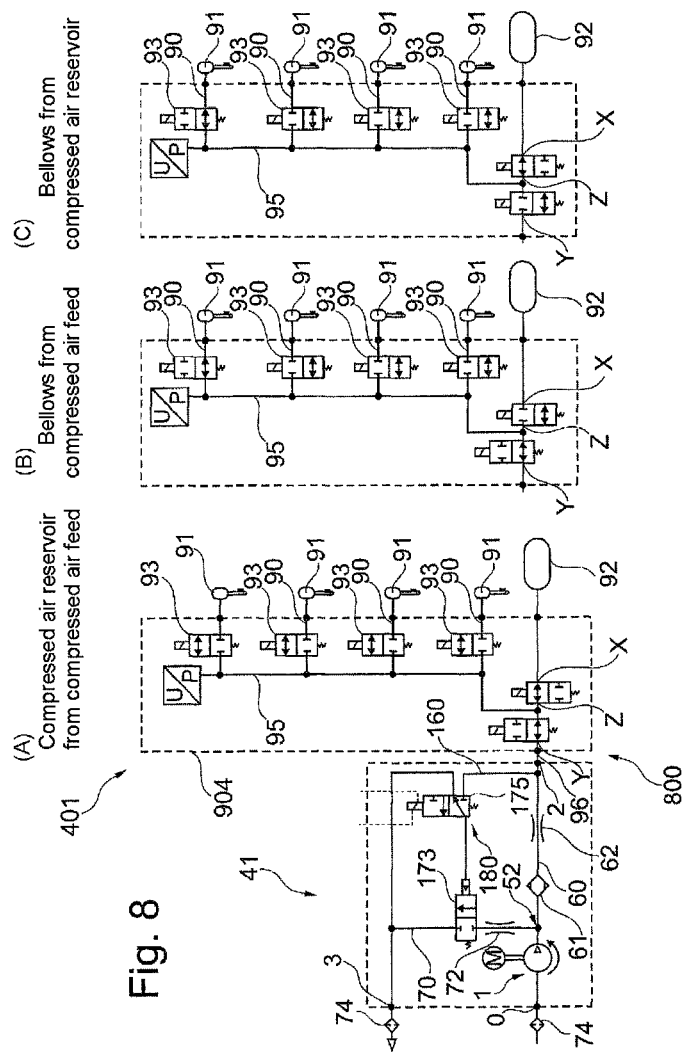
FIG. 8 illustrates different operating states A, B, C of a pneumatic system of FIG. 6 for filling the pneumatic installation.

FIG. 7 and FIG. 8 show in Views (A), (B), (C) different operating positions of a pneumatic system 402, 401, which is used for filling a pneumatic installation 901, 904. In all operating positions, a venting valve 173 of the compressed air supply installation 41 supplying the pneumatic installation 901, 904 with compressed air is closed. Filling of the pneumatic installation 901, 904 takes place either from the compressed air feed 1 via a main pneumatic line 60 of the compressed air supply installation 41 or else from the reservoir 92 of the pneumatic installation 901, 904. FIG. 7 shows the operating positions for a pneumatic system 402 of FIG. 5, wherein the compressed air supply installation 41 is only shown in View (A) for all views of FIG. 7. FIG. 8 shows the operating positions for a pneumatic system 401 of FIG. 6, wherein the compressed air supply installation 41 is only shown in View (A) for all views of FIG. 8.

View (A) of FIG. 7 or FIG. 8 shows the isolating valve assembly 900, 800 in a functional position that enables filling of the reservoir 92 with compressed air from the compressed air feed 1 via the main pneumatic line 60, the compressed air connection 2 and the further pneumatic line 96 as well as the isolating valve assembly 900 or 800. For this, the 3/4-way solenoid valve of the isolating valve assembly 900 of View (A) of FIG. 7 is in a functional position in which a connection between the first port X and the second port Y is open. In this way, the compressed air connection 2 to the air dryer 61 and the reservoir 92 are pneumatically connected to each other. The 3/4-way solenoid valve is energized for this purpose and is brought from the de-energized position shown in FIG. 5 into the functional position shown in FIG. 7A. In FIG. 7A, filling of the gallery line 95 is prevented because of the functional position of the isolating valve assembly 900, because the third port Z is not pneumatically open to the second port Y.

In relation to FIG. 8, View (A), energizing is carried out for the isolating valve assembly 800 consisting of the first control valve 801 and the second control valve 802 such that the primary valve I formed by the first control valve 801 changes from a normally closed position into a normally open position. In this way, a pneumatically open connection is made between the first port X and the second port Y of the isolating valve assembly 800, so that the reservoir 92 can be filled with compressed air from the compressed air feed 1, the main pneumatic line 60 and the compressed air connection 2 and the other pneumatic line 96 via the isolating valve assembly 800. The open third port Z connected between the first and second control valves 801, 802 principally opens the gallery line 95 for compressed air. Filling of the bellows 91 is prevented because of the normally closed solenoid valves 93, which are each connected as level control valves upstream of a bellows 91.

View (B) of FIG. 7 and FIG. 8 shows a functional position of the isolating valve assembly 900, 800, in which filling of the bellows 91 from the compressed air feed 1 is possible via the main pneumatic line 60, the compressed air connection 2, the further pneumatic line 96 and the respective isolating valve assembly 900, 800. For this, the isolating valve assembly 900, as shown in FIG. 7 View (B) as a 3/4-way solenoid valve, is in a functional position in which the third port Z and the second port Y have a pneumatically open connection to each other. The functional position of the 3/4-way solenoid valve corresponds to the de-energized position of the isolating valve assembly 900. Filling the bellows from the compressed air feed 1 can thus take place for all or individual or groups of bellows with switching through of one or a plurality of or all of the solenoid valves 93. In FIG. 7 View (B), a solenoid valve 93 is switched through as an example, so that there is a pneumatically open connection of the bellows 91 to the gallery line 95 and the bellows can be filled with compressed air from the compressed air feed 1 of the compressed air supply installation 41.

In FIG. 8 View (B), the solenoid valve assembly 800 is likewise held in the de-energized state for filling the bellows. In this state, the first control valve 801 forming the primary valve I is normally closed and the second control valve 802 forming the secondary valve II is normally open. In this way, there is a pneumatically open connection between the third port Z to the gallery line 95 and the second port Y to the compressed air connection 2, while the first port X is closed. That is, the gallery line 95 is pneumatically connected to the compressed air feed 1, while a pneumatic connection to the reservoir 92 is disconnected. The latter is also the case for the isolating valve assembly 900 of View (B) of FIG. 7. Again, individual ones of, a plurality of or all bellows 91 of the pneumatic installation 904 can be filled with compressed air by opening individual, a plurality of or all solenoid valves 93 in the form of the level control valves.

View (C) of FIG. 7 and FIG. 8 show an operating position of the pneumatic system 402 or 401, in which filling the bellows 91 with compressed air from the reservoir 92 is enabled, wherein, however, a pneumatic connection between compressed air feed 1 of the compressed air supply installation 41 and the reservoir 92 is bidirectionally and fully isolated. In other words, cross-linking of the bellows 91 to the reservoir 92 via the gallery line 95 and redistribution of the compressed air from the reservoir 92 to the bellows 91, or vice-versa, is possible without the compressed air supply installation 41 being adversely affected as a result. An adverse effect, in particular on the air dryer 61 in the compressed air supply installation 41, is advantageously prevented. In installations without an isolating valve assembly, by a mere redistribution of compressed air, a compressed air consumption would occur that could only partly or wholly inadequately be used for regeneration of the air dryer 61, which is avoidable. With the functional position of an isolating valve assembly 900, 800 shown in View (C) of FIG. 7 and FIG. 8, it is possible to decouple the air dryer 61 from an air suspension installation and to operate the air suspension installation independently of the compressed air supply installation 41.

In View (C) of FIG. 7, the 3/4-way solenoid valve of the solenoid valve assembly 900 is brought into a functional position in which the first and the third ports X, Z of the solenoid valve assembly 900 are pneumatically connected to each other, while the second port Y is pneumatically disconnected from the compressed air connection 2. In this way, compressed air can pass from the reservoir 92 only into the gallery line 95 and not into the compressed air connection 2. As soon as one, a plurality of or all of the normally closed solenoid valves 93 shown in View (C) of FIG. 7 are opened, compressed air passes into one, a plurality of or all of the bellows 91, which, e.g., can be used for level control of and/or lifting of a vehicle body.

In FIG. 8 View (C), the same function can be achieved with an isolating valve assembly 800, with which the first control valve 801 forming the primary valve I is brought from a normally closed position into an energized open position and the second control valve 802 forming the secondary valve II is brought from a normally open position into an energized closed position. An open pneumatic connection between the reservoir 92 and the gallery line 95 occurs by switching the primary valve I into an open position. By switching the secondary valve II into a closed position, a pneumatic connection between the compressed air feed 1 and the gallery line 95 is disconnected. In the functional position of the isolating valve assembly 800, compressed air can thus pass from the reservoir 92 into the gallery line 95. Again, by opening one, a plurality of or all of the solenoid valves 93, compressed air can pass into one, a plurality of or all of the bellows 91 and can be used for level control of and/or lifting of a vehicle body.

FIG. 9 and FIG. 10 show different operating positions in Views (A), (B), (C), (D) that enable pressure measurement in the pneumatic installation 901 or 904 or cross-linking between the bellows 91 and the reservoir 92 without adversely affecting a compressed air supply installation 41.

View (A) of FIG. 9 also shows a functional position of the isolating valve assembly 900 in which all pneumatic connections between the ports X, Y, Z are disconnected. In this way, a pressure measurement can take place by means of the pressure sensor 98 connected to the gallery line 95 and, preferably for individual bellows 91; in principle, depending on whether individual, some of or all of the solenoid valves 93 are opened or in the normally closed position.

In View (A) of FIG. 10, this operating position is enabled in a functional position of the solenoid valve assembly 800 in which the primary valve I formed by the first control valve 801 remains in the normally closed position and the secondary valve II formed by the second control valve 802 is brought into a closed position by energizing. Thereby, all three ports X, Y, Z are likewise pneumatically isolated from each other. This, again, enables a pressure measurement in the gallery line 95 for individual, a plurality of or all of the bellows 91 by means of a pressure sensor 98 that is connected to the gallery line 95.

View (B) of FIG. 9 or FIG. 10 shows an operating position of the pneumatic system 402 or 401, in which, in the pneumatic installation 901 or 904, a pressure in the reservoir 92 can be measured by means of a pressure sensor connected to the gallery line 95. For this, the pneumatic installation 901 or 904 is brought into an operating position in which the reservoir 92 is pneumatically connected to the gallery line 95, while a pneumatic connection of the gallery line 95 to the bellows 91 is disconnected. The solenoid valves 93 are held in the normally closed position. In View (B) of FIG. 9, the isolating valve assembly 900 in the form of the 3/4-way solenoid valve is brought into an operating position in which a pneumatic connection is made between the first port X and the third port Z and a pneumatic connection to the second port Y is disconnected. A reservoir 92 connected via the 3/4-way solenoid valve to the gallery line 95 can thus also be detected with respect to a pressure measurement by a pressure sensor 98 in the gallery line 95.

In View (B) of FIG. 10, for the same operating position, the isolating valve assembly 800 is brought into a functional position in which the primary valve I formed by the first control valve 801 is open when energized and the secondary valve II formed by the second control valve 802 is closed when energized. In other words, the de-energized position of the isolating valve assembly 800 as shown in FIG. 8 (B) is inverted. In this way, the reservoir 92 is pneumatically connected to the gallery line 95 and a pressure of the reservoir 92 can thus be read out by means of a pressure sensor 98 that is connected to the gallery line 95.

View (C) of FIG. 9 and FIG. 10 shows an alternative option to View (B) of FIG. 9 and FIG. 10 for pressure measurement for a reservoir 92, which takes place by means of a pressure sensor 98, which is connected via a sensor branch line 99 directly to the reservoir 92. For this variant of a pneumatic installation 902, it is sufficient to provide an isolating valve assembly 700 in the form of a 3/3-way solenoid valve. In the functional position of the isolating valve assembly 700 shown in View (C) of FIG. 9, this remains in the de-energized position similar to the functional position of the 3/4-way valve assembly 900 shown in FIG. 5. In addition, the first port X connected to the reservoir 92 is disconnected from any pneumatic connection. Instead, the pneumatic connection between the second and third ports Y, Z of the isolating valve assembly 700 is maintained. The reservoir 92 is thus decoupled from the remaining pneumatic installation 902 and also from the compressed air supply installation 41 and a pressure can, as described, be directly measured at the reservoir 92.

As shown in View (C) of FIG. 10, an isolating valve assembly 800 can also be used for the variant 905 of a pneumatic installation with a pressure sensor 98 directly connected to the reservoir 92 via a sensor branch line 99. For this, the isolating valve assembly 800 remains in the de-energized position shown in FIG. 6 and a pneumatic connection of the first port X, to which the reservoir 92 is connected, is disconnected. The pressure of the reservoir 92 thus decoupled from the other pneumatic installation 905 can thus be measured by the pressure sensor 98. The other pneumatic connection between a second port and a third port Y, Z of the isolating valve assembly 800 is opened.

With the variant of View (C) of FIG. 9 and of FIG. 10, a bellows 91 can be filled with compressed air from the compressed air feed 1 via the isolating valve assembly 700, 800 in parallel with the pressure measurement in the reservoir 92, as is illustrated in View (B) of FIG. 7 or FIG. 8.

FIG. 11 and FIG. 12 show operating positions of a pneumatic system 402 or 401 with a respective pneumatic installation 901 or 904, according to which venting of the pneumatic installation 901 or 904 can take place. In both cases, a venting solenoid valve assembly 180 is opened for this, so that the pneumatic installation 901 or 904 can be vented to the venting connection 3 via the main pneumatic line 60, the air dryer 61 and the venting line 70—i.e., via the venting valve 173 in the form of a relay valve.

In View (A) of FIG. 11 and FIG. 12, venting the bellows 91 is provided. For this, the isolating valve assembly 900 is in a de-energized position, as is shown in FIG. 5, so that there is a pneumatic connection between the gallery line 95 and the venting connection 3. For venting one or a plurality of the bellows 91, it is only necessary to open one or a plurality of the level control valves, i.e., the solenoid valves 93. The simultaneous opening of all solenoid valves 93 is avoided here if possible in order to avoid sudden pitching of a vehicle.

In the pneumatic installation 904 shown in View (A) of FIG. 12, the isolating valve assembly 800 is likewise in the de-energized position shown in FIG. 6, namely, with a normally closed first control valve 801 to form a closed primary valve I and with a normally open control valve 802 to form an open secondary valve II. Thereby, as with the isolating valve assembly 900, on the one hand, the reservoir 92 is pneumatically disconnected from the gallery line 95, and, on the other hand, the gallery line 95 is pneumatically openly connected to the venting connection 3.

In order to be able to vent the reservoir 92 in exceptional cases, such as a thermally induced pressure rise, the isolating valve assembly 900, 800 is brought into a functional position—as shown in View (B) of FIG. 11 and FIG. 12—in which the reservoir 92 has a pneumatically open connection to the venting connection 3, namely, via the pneumatic line 96, the main pneumatic line 60 and the venting line 70. From View (B) of FIG. 11, it is apparent that, for this, the isolating valve assembly 900 is in a functional position in which there is a pneumatically open connection between the first port X and the second port Y, while a pneumatic connection of the third port Z is disconnected. In this way, venting of the reservoir 92 can safely take place even with open level control valves, i.e., solenoid valves 93, of the air springs.

With the isolating valve assembly 800 shown in View (B) of FIG. 12, venting the reservoir 92 takes place with gallery line 95 open, i.e., the gallery line 95 has a pneumatic connection via the third port Z and the second port Y to the venting connection 3. In order to prevent unintentional filling or venting of the bellows 91 as well, it is necessary that the level control valves, i.e., the solenoid valves 93, are closed.

In summary, the present invention generally relates to embodiments of a pneumatic installation 901, 902, 903, 904, 905, in particular in the form of an air suspension installation for a vehicle, provided for operation with a compressed air supply installation 11, 21, 31, 41, comprising:

a collecting line in the form of a gallery line 95;

at least one air spring with a pressure chamber that can be pneumatically connected to the gallery line 95;

a reservoir 92 for compressed air, which can be pneumatically connected to the gallery line 95; and a compressed air connection 2 for a pneumatic connection of the pneumatic installation 901, 902, 903, 904, 905 to the compressed air supply installation 11, 21, 31, 41, the pneumatic connection comprising:
- comprises a controllable isolating valve assembly 700, 800, 800', 900 including at least one control valve with a first, second and third port X, Y, Z, wherein
- the reservoir 92 is pneumatically connected to the first port X,
- the compressed air connection 2 is pneumatically connected to the second port Y, and
- the gallery line 95 is pneumatically connected to the third port Z;

wherein the second port Y can be switched into a closed state in which the pneumatic connection is bidirectionally and fully closed.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. An air suspension system for a vehicle having a pneumatic system operable with a compressed air supply system, the air suspension system comprising:
   a gallery line; and
   a plurality of bellows, each of the bellows being a pressure chamber for an air spring; and
   a controllable isolating valve assembly, the bellows being connected to the gallery line such that the pneumatic system is fillable and ventable to atmosphere from the compressed air supply system via the isolating valve assembly, the isolating valve assembly comprising:
   (i) a first port pneumatically connected to a reservoir via a reservoir branch line;
   (ii) a second port bidirectionally connected to an air dryer of the compressed air supply system via a pneumatic line; and
   (iii) a third port pneumatically connected to the gallery line, wherein the isolating valve assembly is configured to adopt at least three switch positions, in at least one of the switch positions the second port of the isolating valve assembly being switchable into a closed state in which pneumatic connection between the gallery line and the air dryer is bidirectionally and fully closed.

2. The air suspension system as claimed in claim 1, wherein the isolating valve assembly is the only valve assembly between the gallery line and the pneumatic line to the air dryer.

3. The air suspension system as claimed in claim 1, wherein a one of the plurality of bellows is connected via a control valve in a bellows branch line to the gallery line.

4. The air suspension system as claimed in claim 3, wherein the control valve is a solenoid valve.

5. The air suspension system as claimed in claim 1, wherein the isolating valve assembly is configured to adopt a fourth switch position.

6. The air suspension system as claimed in claim 1, wherein the isolating valve assembly includes a first and a second control valve, the third port being pneumatically between the first control valve and the second control valve.

7. The air suspension system as claimed in claim 6, wherein at least one of (i) the first port is disposed on the first control valve and (ii) the second port is disposed on the second control valve.

8. The air suspension system as claimed in claim 6, wherein at least one of the first and second control valves is a 2/2-way valve.

9. The air suspension system as claimed in claim 6, wherein the first and second control valves form a dual armature solenoid valve.

10. The air suspension system as claimed in claim 6, wherein the first control valve is disposed in a reservoir branch line and the second control valve is disposed between the gallery line and the pneumatic line.

11. The air suspension system as claimed in claim 1, wherein the isolating valve assembly is a 3/4-way valve.

12. The air suspension system as claimed in claim 1, wherein the isolating valve assembly is configured to adopt three switch positions via a 3/3-way valve.

13. The air suspension system as claimed in claim 1, further comprising a reservoir branch line having no valves.

14. The air suspension system as claimed in claim 1, wherein the isolating valve assembly includes at least one control valve disposed in a valve block together with a plurality of solenoid valves each of a respective bellows branch line.

15. A compressed air supply system operable with the air suspension system as claimed in claim 1, comprising:
   a compressed air feed;
   a main pneumatic line of the compressed air feed connectable to the gallery line, the main pneumatic line including the air dryer, a restrictor and a compressed air connection to the gallery line;
   the controllable isolating valve assembly including at least one control valve via which the pneumatic system is one of tillable and ventable, the isolating valve assembly being connected to the compressed air connection to the gallery line; and
   a venting line pneumatically connected to the main pneumatic line and a venting connection to atmosphere, the venting line having a controllable venting valve;
   wherein the main pneumatic line is pneumatically connected to the second port of the isolating valve assembly, and the compressed air connection to the gallery line is pneumatically connected to the third port.

16. A pneumatic system operable with the air suspension system and the compressed air supply system as claimed in claim 15.

17. The air suspension system as claimed in claim 1, the isolating valve assembly comprising:
   at least one electrically-controllable valve for selectively isolating the air dryer from the reservoir.

18. The air suspension system as claimed in claim 1, wherein the pneumatic line is the only pneumatic line between the air dryer and the isolating valve assembly.

19. The air suspension system as claimed in claim 1, wherein the isolating valve assembly selectively isolates the pneumatic system from the compressed air supply system.

* * * * *